United States Patent
Nomura et al.

(10) Patent No.: US 7,747,668 B2
(45) Date of Patent: *Jun. 29, 2010

(54) PRODUCT-SUM OPERATION CIRCUIT AND METHOD

(75) Inventors: Osamu Nomura, Fukuoka-ken (JP);
Takashi Morie, Hiroshima-ken (JP);
Keisuke Korekado, Fukuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1444 days.

This patent is subject to a terminal disclaimer.

(21) Appl. No.: 11/055,283

(22) Filed: Feb. 10, 2005

(65) Prior Publication Data

US 2005/0138100 A1 Jun. 23, 2005

Related U.S. Application Data

(63) Continuation of application No. PCT/JP2004/015554, filed on Oct. 14, 2004.

(30) Foreign Application Priority Data

Oct. 16, 2003 (JP) .............................. 2003-356625

(51) Int. Cl.
*G06F 7/00* (2006.01)

(52) U.S. Cl. ........................................................ 708/603

(58) Field of Classification Search ................ 708/501, 708/523, 603
See application file for complete search history.

(56) References Cited

U.S. PATENT DOCUMENTS

| | | | | |
|---|---|---|---|---|
| 5,058,594 A * | 10/1991 | Lazenby | ...................... | 600/454 |
| 5,249,146 A | 9/1993 | Uramoto et al. | ............. | 364/725 |
| 5,398,300 A | 3/1995 | Levey | | |
| 5,465,371 A | 11/1995 | Fujii et al. | | |
| 5,880,981 A | 3/1999 | Kojima et al. | .......... | 364/736.02 |
| 6,128,614 A | 10/2000 | Mennemeier et al. | | |
| 7,120,617 B2 * | 10/2006 | Nomura et al. | ................ | 706/26 |
| 7,272,585 B2 * | 9/2007 | Nomura et al. | ................ | 706/26 |
| 2005/0122238 A1 | 6/2005 | Nomura et al. | ................ | 341/53 |
| 2005/0138100 A1 | 6/2005 | Nomura et al. | ............. | 708/523 |
| 2005/0160130 A1 | 7/2005 | Korekado et al. | ........... | 708/801 |

FOREIGN PATENT DOCUMENTS

| | | |
|---|---|---|
| EP | 0 533 193 | 3/1993 |
| EP | 0 694 855 | 1/1996 |
| JP | 02-201586 | 8/1990 |
| JP | 4-313157 | 11/1992 |
| JP | 5-210651 | 8/1993 |

(Continued)

OTHER PUBLICATIONS

Japanese Office Action dated Dec. 1, 2009, in corresponding Japanese Application No. 2003-356625.

*Primary Examiner*—Chuong D Ngo
(74) *Attorney, Agent, or Firm*—Fitzpatrick, Cella, Harper & Scinto

(57) ABSTRACT

A product-sum operation circuit includes a sorting block (4) which outputs a plurality of operand values x1, x2, . . . xi in descending or ascending order of magnitude, and an operation unit (1) which multiplies each operand value xi output from the sorting block (4) by a corresponding operand value Wi and calculates the accumulated sum of multiplication results.

17 Claims, 35 Drawing Sheets

FOREIGN PATENT DOCUMENTS

| | | |
|---|---|---|
| JP | 6-332670 | 12/1994 |
| JP | 10-187438 | 7/1998 |
| JP | 10-240938 | 9/1998 |
| JP | 2000-172674 | 6/2000 |
| JP | 2003-015863 | 1/2003 |

\* cited by examiner

FIG. 3

| LABEL | OPERAND VALUE $X_i$ | DETECTION FLAG |
|---|---|---|
| | | |
| | | |
| | | |
| MEMORY CELL ARRAY | | |
| | | |
| | | |
| ⋮ | ⋮ | ⋮ |
| | | |

FIG. 4

| LABEL | FLAG |
|---|---|
|  | 0 |
|  | 1 |
|  | 0 |
| MEMORY CELL ARRAY | 0 |
|  | 0 |
|  | 1 |
| ⋮ | ⋮ |
|  |  |

F I G. 15
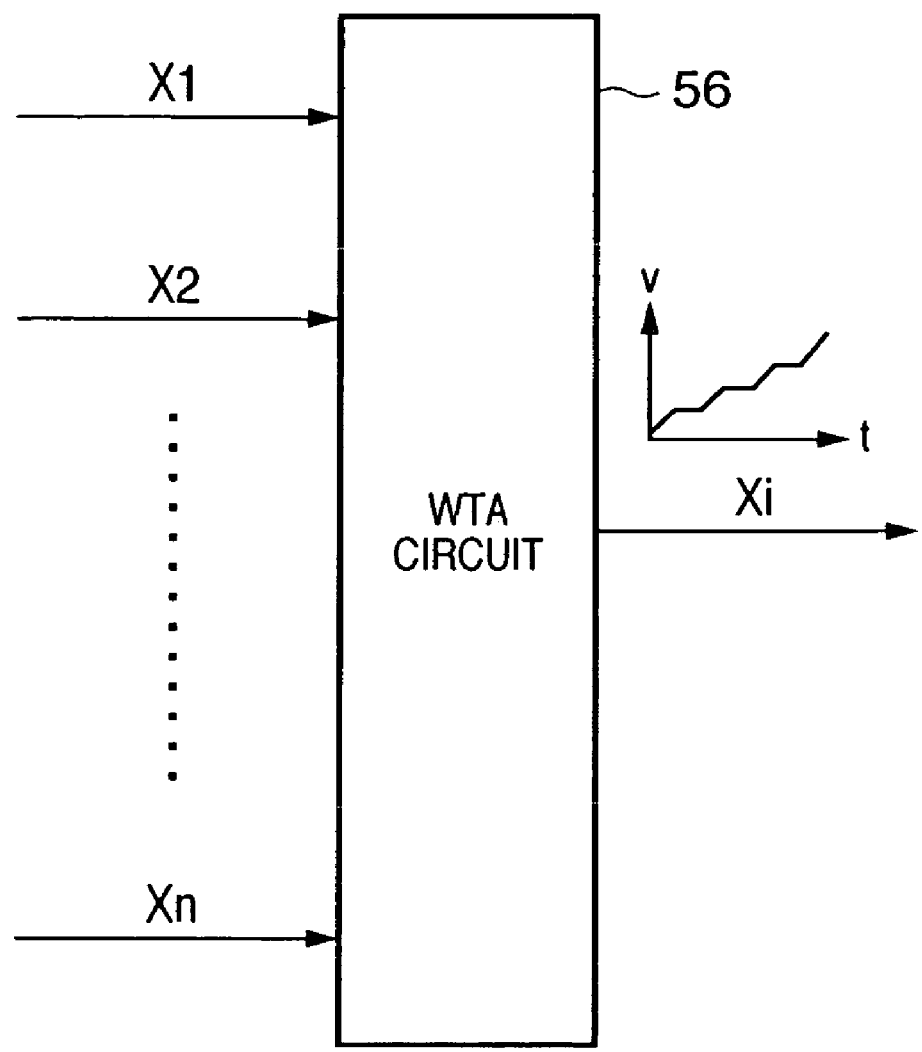

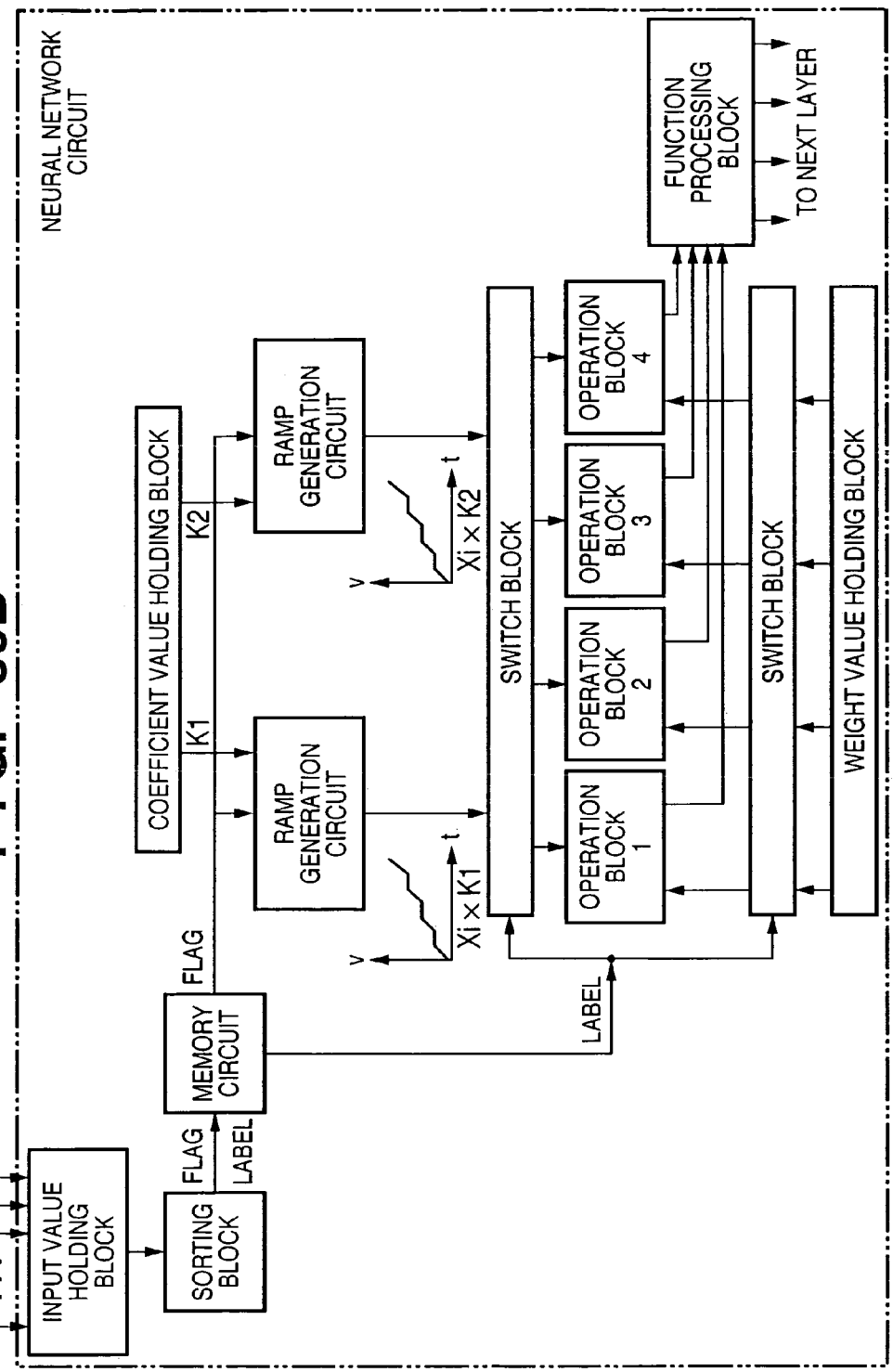
F I G. 30B

PRODUCT-SUM OPERATION CIRCUIT AND METHOD

TECHNICAL FIELD

The present invention relates to a product-sum operation circuit and method which execute multiplication and accumulation in parallel.

BACKGROUND ART

Computers are making leap developments and are used in various scenes in the society these days. However, these computers called Neumann types are very weak in processing (e.g., real-time human face recognition) easy for a human because of their characteristics in processing schemes themselves.

To cope with such processing, research has been done on neural networks as operation processing models which mimic the information processing scheme of the brain.

As a model of neurons which form a neural network, generally, output values from a plurality of units (neurons) are weighted by a synaptic weight, and the products are input to a unit corresponding to a neuron. The sum of input values is further nonlinearly converted and output. That is, in a general neural network, desired processing is realized by product-sum operation and nonlinear conversion in each unit and between units.

As neural network architectures using the neuron model, associative memories which connect units that execute the product-sum operation to each other or pattern recognition models which hierarchically connect units that execute the product-sum operation have been proposed conventionally.

To put a neural network into practical use and form it as an integrated circuit, the product-sum operation must be executed more efficiently. Especially, the efficiency is necessary in the execution speed of operation and power consumption.

Various proposals have been made in association with the neuron models and neural network architectures which execute the product-sum operation. For example, Japanese Patent Laid-Open No. 05-210651 discloses a method of executing a product-sum operation to form a hierarchical neurocomputer.

DISCLOSURE OF INVENTION

It is an object of the present invention to provide a product-sum operation circuit and method which reduce power consumption and increase the speed by controlling the operation order or operation range of operand values in a product-sum operation.

In order to achieve the above object, for example, according to an aspect of the present invention, there is provided a product-sum operation circuit comprising a sorting circuit which outputs a plurality of operand values in descending or ascending order of magnitude, a multiplication circuit which multiplies each operand value output from the sorting circuit by a corresponding operand value and an accumulated sum circuit which calculates an accumulated sum of multiplication results by the multiplication circuit.

According to another aspect of the present invention, there is provided a method of executing a product-sum operation, comprising the steps of outputting a plurality of operand values in descending or ascending order of magnitude, multiplying each output operand value by a corresponding operand value, and calculating an accumulated sum of multiplication results.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the descriptions, serve to explain the principle of the invention.

FIG. 3 is a view showing an example of the memory cell structure of an associative memory circuit in the first embodiment, which is formed by the functions of an input value holding circuit and sorting circuit according to the first embodiment;

FIG. 4 is a view showing an example of the memory cell structure of a memory according to the first embodiment;

FIG. 15 is a block diagram showing an example of a ramp generation circuit according to the fourth embodiment;

FIGS. 30A and 30B are block diagrams showing an example of a product-sum operation circuit according to the 14th embodiment.

BEST MODE FOR CARRYING OUT THE INVENTION

Preferred embodiments of the present invention will now be described in detail in accordance with the accompanying drawings.

First Embodiment

Figure 1:
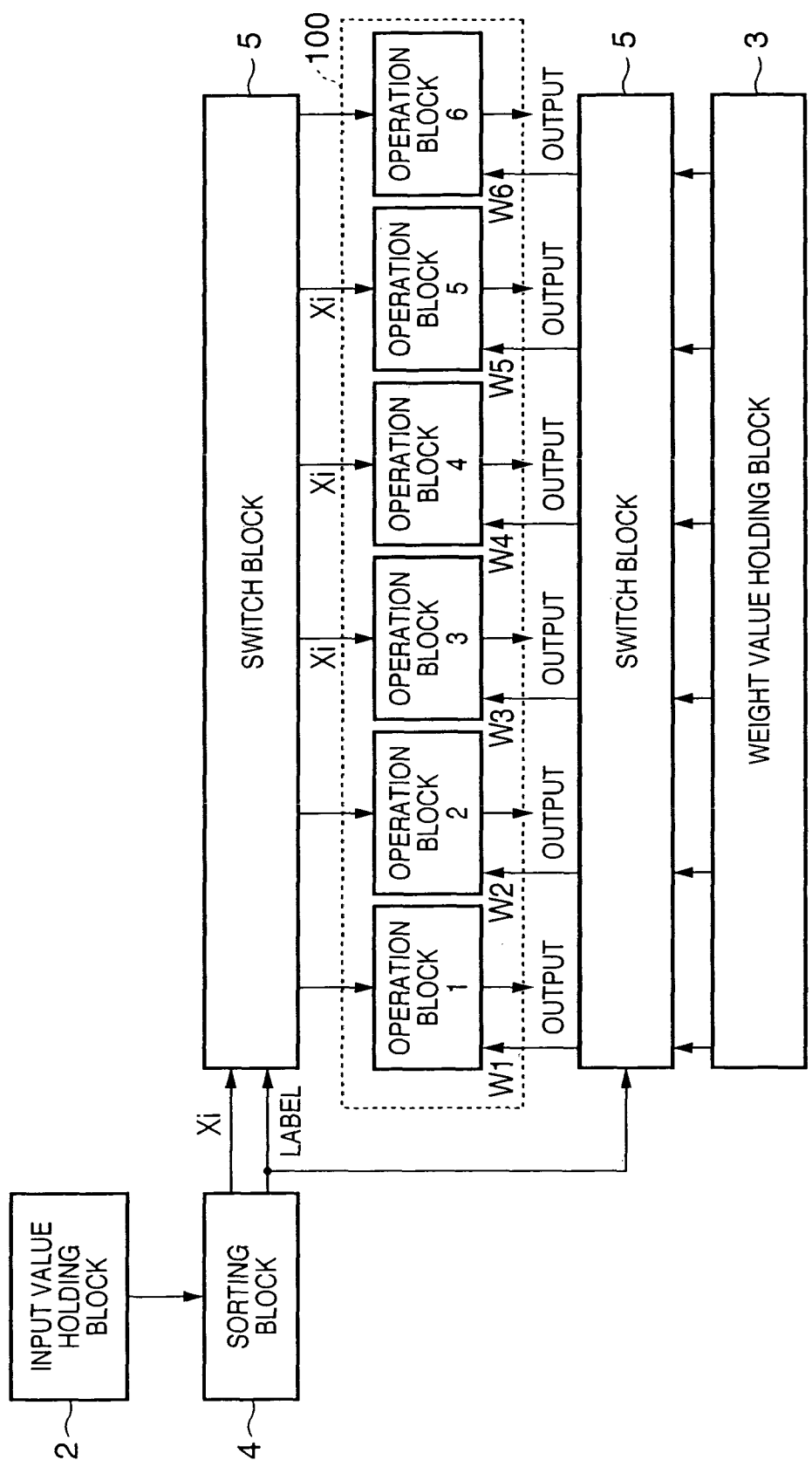
FIG. 1 is a block diagram showing an example of a product-sum operation circuit according to the first embodiment.

FIG. 1 is a block diagram showing a product-sum operation circuit according to this embodiment.

As shown in FIG. 1, the product-sum operation circuit according to this embodiment includes an operation unit 100 including a plurality of operation blocks (operation blocks 1 to 6 in the example shown in FIG. 1), an input value holding block 2 which holds operand values $X_i$, a weight value holding block 3 which holds operand values $W_i$, a sorting block 4 which outputs the operand values $X_i$ in descending order of magnitude, and a switch block 5 to input the operand value $X_i$ and operand value $W_i$ to an operation block corresponding to the label of the operand value $X_i$. Note that i of the operand value $X_i$ and operand value $W_i$ is a suffix representing different X and W and takes a natural number such as 1, 2, 3, . . . (this also applies to the following description).

Figure 2:
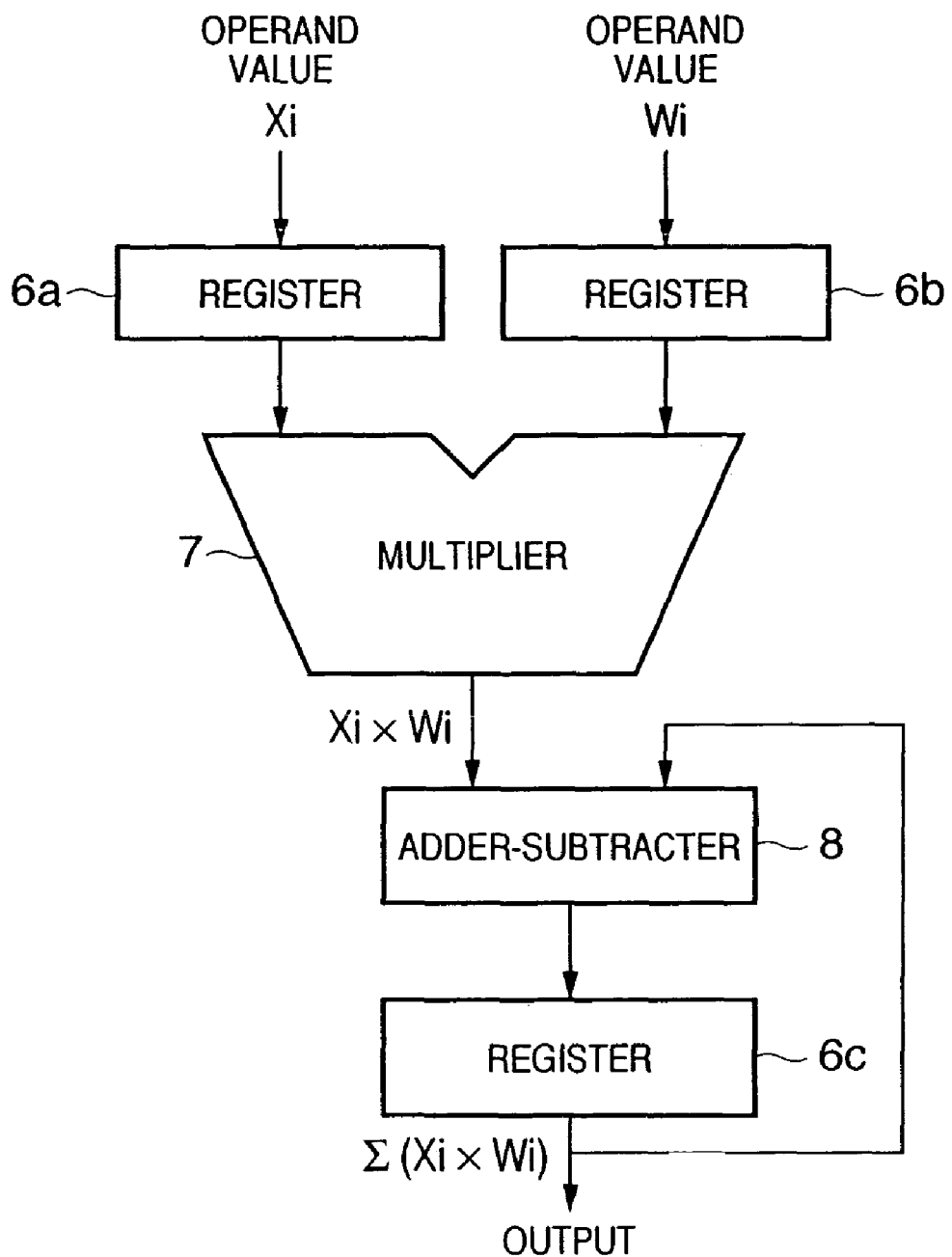
FIG. 2 is a block diagram showing an example of a digital operation circuit according to the first embodiment.

FIG. 2 shows a digital operation circuit in which operation block 1 is formed as a digital circuit. Operation blocks 2 to 6 can also have the same arrangement. As shown in FIG. 2, the digital operation circuit according to this embodiment includes three registers 6a to 6c, a multiplier 7, and an adder-subtracter 8.

Operation processing by the product-sum operation circuit according to this embodiment will be described next.

As shown in FIG. 1, the plurality of operand values $X_i$ are held in the input holding block 2 and sorted and output by the sorting block 4 in descending order of magnitude. In this embodiment, if there are the operand values $X_i$ having the same value, they are output in an arbitrary order. Instead, an appropriate order may be set in advance.

Subsequently, the label the operand value $X_i$ has is input from the sorting block 4 to the switch block 5. The switch block 5 executes switching in accordance with the label to input the operand value $X_i$ output from the sorting block 4 to operation blocks corresponding to the label. Either one operation block or a plurality of operation blocks can correspond to the label of the operand value $X_i$. In the example to be described in this embodiment, a plurality of operation blocks correspond to a label.

In this embodiment, the processing executed by the input holding block 2 and sorting block 4 is implemented by using an associative memory circuit. FIG. 3 shows an example of the memory cell structure of the associative memory circuit. As shown in FIG. 3, the associative memory circuit holds the values of the operand values $X_i$ and the labels and detection flags of the operand values $X_i$.

The associative memory circuit has a function of comparing an input search value with held data and outputting data having a coincident value. The processing executed by the input holding block and sorting block can be implemented by reading out the operand values $X_i$ having no detection flags and their labels one by one in descending order of magnitude, and setting detection flags for the read values using the general function of the associative memory circuit.

That is, the sorting function can be realized (conversely, data may be read out in ascending order of magnitude of the operand values $X_i$) by inputting search values to the associative memory circuit sequentially in descending order of magnitude from a value corresponding to the maximum operand value $X_i$, and sequentially reading out data having coincident values.

In this embodiment, as described above, the function of the input holding block 2 and sorting block 4 is implemented by the associative memory circuit. However, the detailed circuit arrangement is not the gist of the present invention. Any other processing arrangement can be used if it can execute similar processing.

The plurality of operand values $W_i$ output from the weight value holding block 3 are input to predetermined operation blocks. In this embodiment, even for the operand value $W_i$, the switch block 5 executes switching in accordance with the label of each operand value $X_i$, as in the operand value $X_i$, to input the operand value $W_i$ to a predetermined operation block determined by the label.

Unlike this embodiment, the operation block to which the operand value $W_i$ should be input may be set in advance independently of the label of the operand value $X_i$.

In addition, the value of the operand value $W_i$ input to each operation block may remain unchanged or change between operations.

In this embodiment, the weight value holding block 3 can be formed by a general SRAM circuit. However, any other processing arrangement can be used if it can execute similar processing.

By executing the above-described processing, the operand values $X_i$ and operand values $W_i$ are input to predetermined operation blocks.

In this embodiment, predetermined operation blocks (operation blocks in which operation processing is to be executed) are operation blocks 3 to 5 in FIG. 1.

The operation processing to be executed in the predetermined operation blocks to which both the operand values $X_i$ and the operand values $W_i$ are input will be described. The operation processing is not executed in an operation block to which no operand value $X_i$ is input.

In the operation block shown in FIG. 2, the operand value $X_i$ and operand value $W_i$ are temporarily held in the register 6a and register 6b, respectively. Then, $X_i \times W_i$ is operated by the multiplier 7.

The multiplication result of Xi×Wi is input to the adder-subtracter 8, added/subtracted to/from the result held in the register 6c, and held in the register 6c.

By repeating the above-described processing, the accumulation value of a plurality of multiplication results of Xi×Wi is held in the register 6c. When a predetermined number of accumulations are ended, the accumulation value is output.

As described above, the operand values Xi to be held in the register 6a are input in descending order of magnitude by the processing in the sorting block 4. The operand values Xi having the same value are continuously input. For these reasons, as compared to a case in which the operand values Xi are input at random, the data transition frequency in the register becomes low, and power consumption by data transition can be reduced.

In this embodiment, the operand value Xi itself is input from the sorting block 4 to operation unit 1. In searching for the operand values Xi in descending order of magnitude in the associative memory, the value held in the register 6a in the operation block may be changed only when the value Xi changes.

In this case, not the operand value Xi itself but a flag signal which instructs to appropriately update the value in the register 6a is input from the sorting block 4 to operation unit 1.

In this embodiment, the sorting block 4 sorts the operand values Xi in descending order of magnitude. Even when the operand values Xi are sorted in ascending order of magnitude, the same effect as described above can be obtained.

Figure 4:
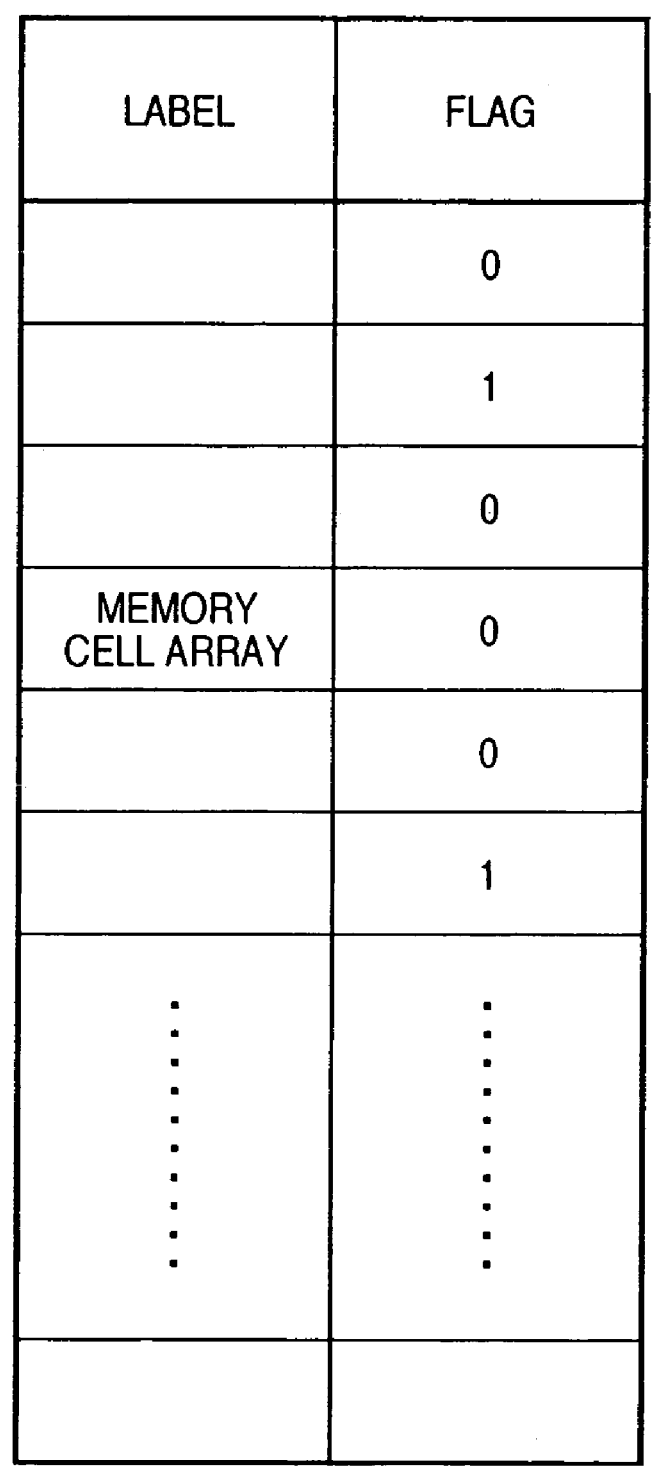

In this embodiment, the outputs from the associative memory are directly input to operation unit 1 and the switch block 5. The data of the operand values Xi which are output from the associative memory in descending order of magnitude may temporarily be input to and held in a memory such as an SRAM and then input from the SRAM to operation unit 1 and the switch block 5. In this case, the label and value of each operand value may be held in the memory. Instead of the value, a flag representing the position where the values of the operand values Xi arranged in descending order of magnitude change may be held, as described above. FIG. 4 shows an example of the memory cell structure when a flag is held in the SRAM.

A case in which the operand value Xi is input to the input value holding block 2 as a PWM (Pulse Width Modulation) signal in this embodiment will be described next with reference to FIG. 5.

The characteristic of the PWM signal will be described briefly. In the PWM signal, the width of the pulse waveform has information. The PWM signal has both a digital characteristic resistant to noise (a characteristic representing that binary information of high and low levels are held in the voltage direction) and an analog characteristic capable of expressing continuous information by one pulse (a characteristic representing that continuous information is held in the time direction).

Figure 5:
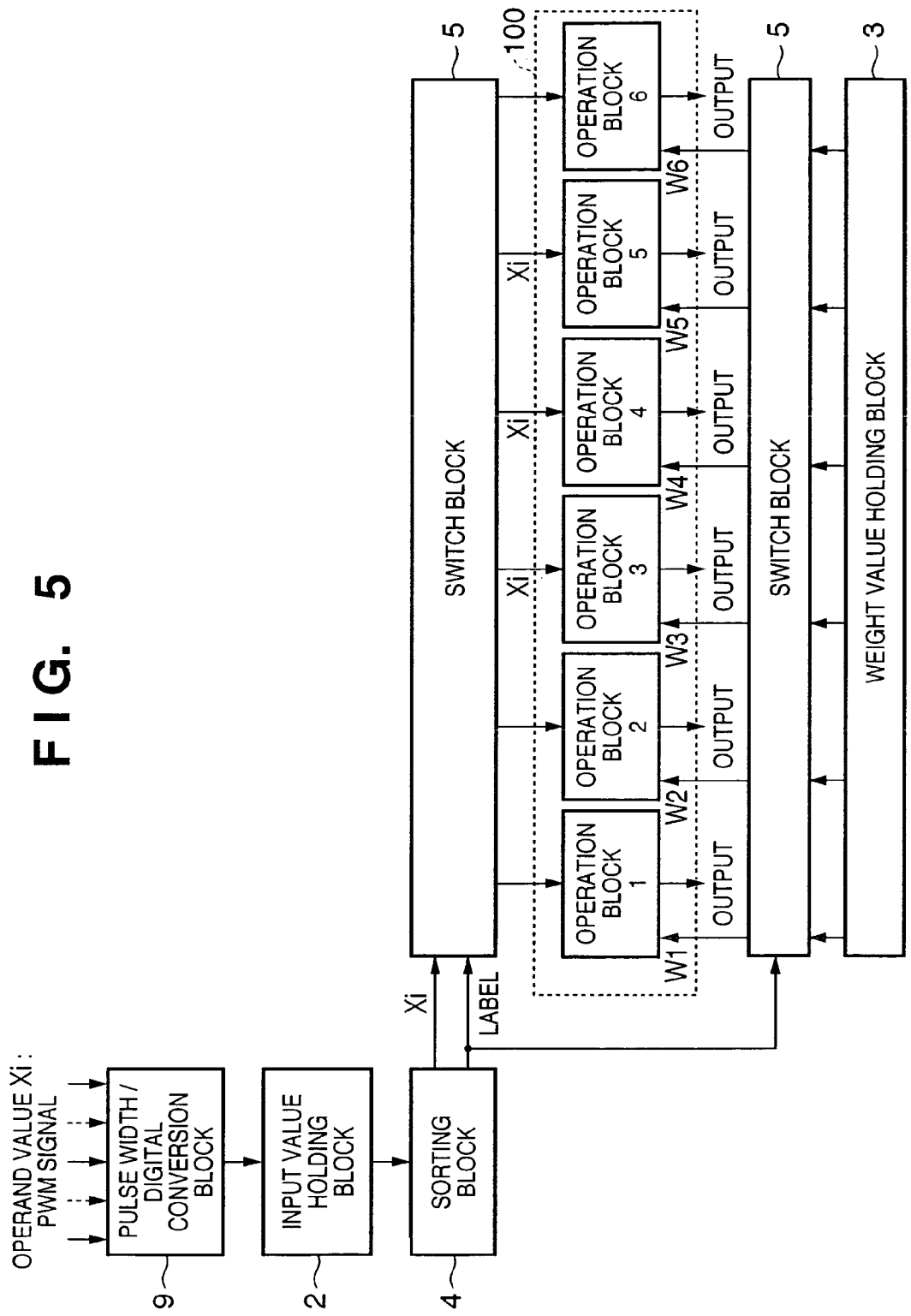
FIG. 5 is a block diagram showing another example of the product-sum operation circuit according to the first embodiment.

The product-sum operation circuit shown in FIG. 5 is the same as the above-described arrangement (FIG. 1) except a pulse width/digital conversion block 9 is arranged in the input unit of the input holding block 2. More specifically, each operand value Xi input as a PWM signal is converted into a digital signal by the pulse width/digital conversion block 9 and then held in the input value holding block 2.

An example of the pulse width/digital conversion block 9 having the function of converting an input PWM signal into a digital value and outputting it counts the pulse width of the input PWM signal by a counter and outputs the count value as a digital value (e.g., Yasoji Suzuki & Masahiro Yoshida, "Introduction to Pulse/Digital Circuit", Nikkan Kogyo Shimbun, issued Jul. 26, 2001, pp. 225-232). There are many other arrangements that implement the function of the pulse width/digital conversion block 9. However, the arrangement and processing procedures of the pulse width/digital conversion block 9 itself are not the gist of the present invention, and a detailed description thereof will be omitted.

Second Embodiment

In the second embodiment, a product-sum operation circuit is implemented by using an analog circuit. The block arrangement of the product-sum operation circuit according to this embodiment is shown in FIG. 1, as in the first embodiment.

Figure 6:
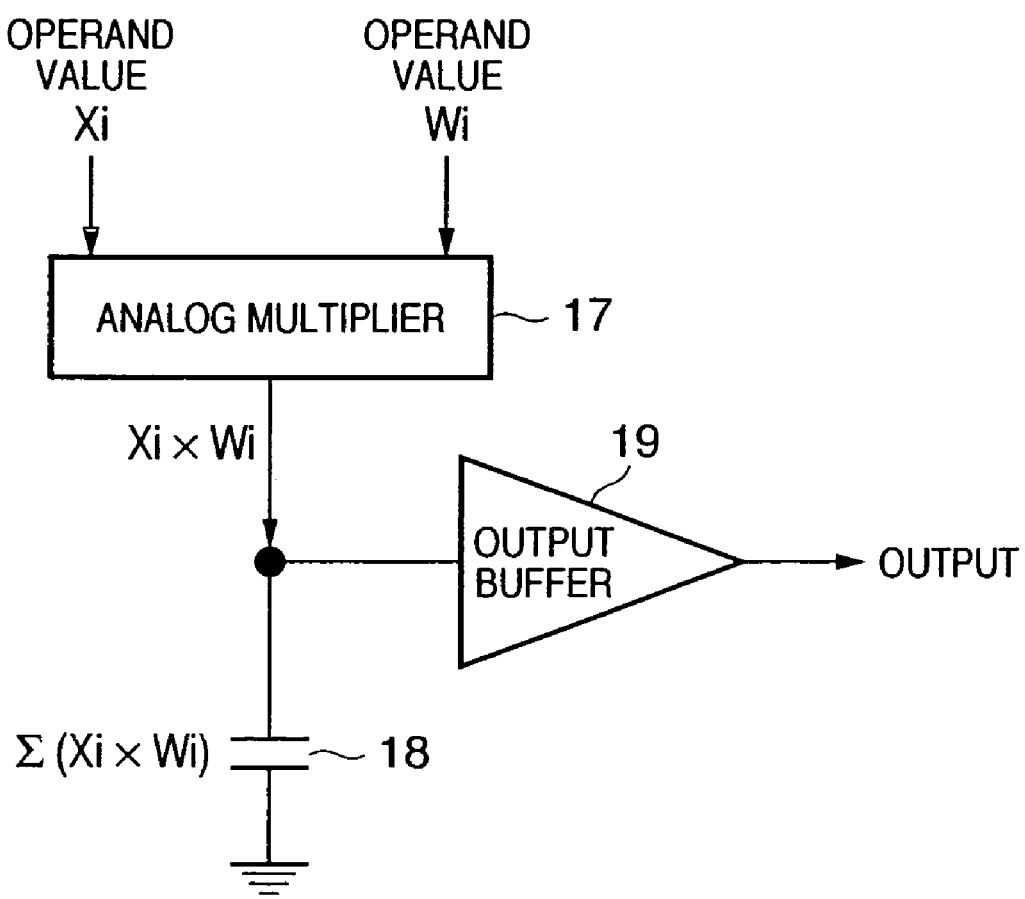
FIG. 6 is a block diagram showing an example of an analog operation circuit according to the second embodiment.

FIG. 6 shows an analog operation circuit which forms operation block 1 as an analog circuit. Operation blocks 2 to 6 can also have the same arrangement. As shown in FIG. 6, the analog operation circuit of this embodiment includes an analog multiplier 17, capacitor 18, and output buffer 19.

Figure 7:
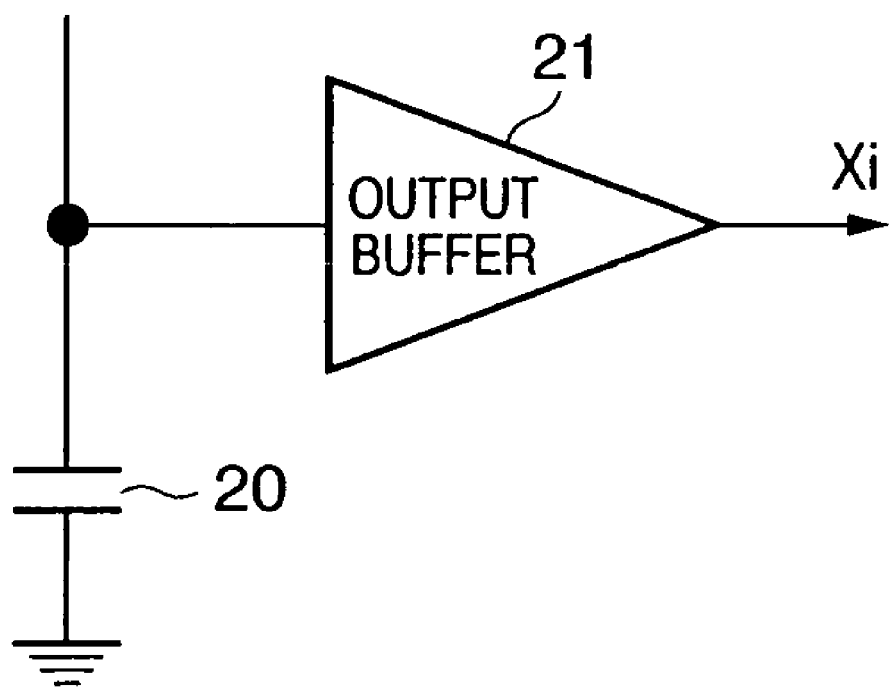
FIG. 7 is a block diagram showing an example of an input value holding block according to the second embodiment.

FIG. 7 shows an input value holding block 2 including an analog memory. In this embodiment, the analog memory is assumed to include a capacitor 20 and output buffer 21. However, any other circuit may be used as long as it has the same function.

Figure 8:
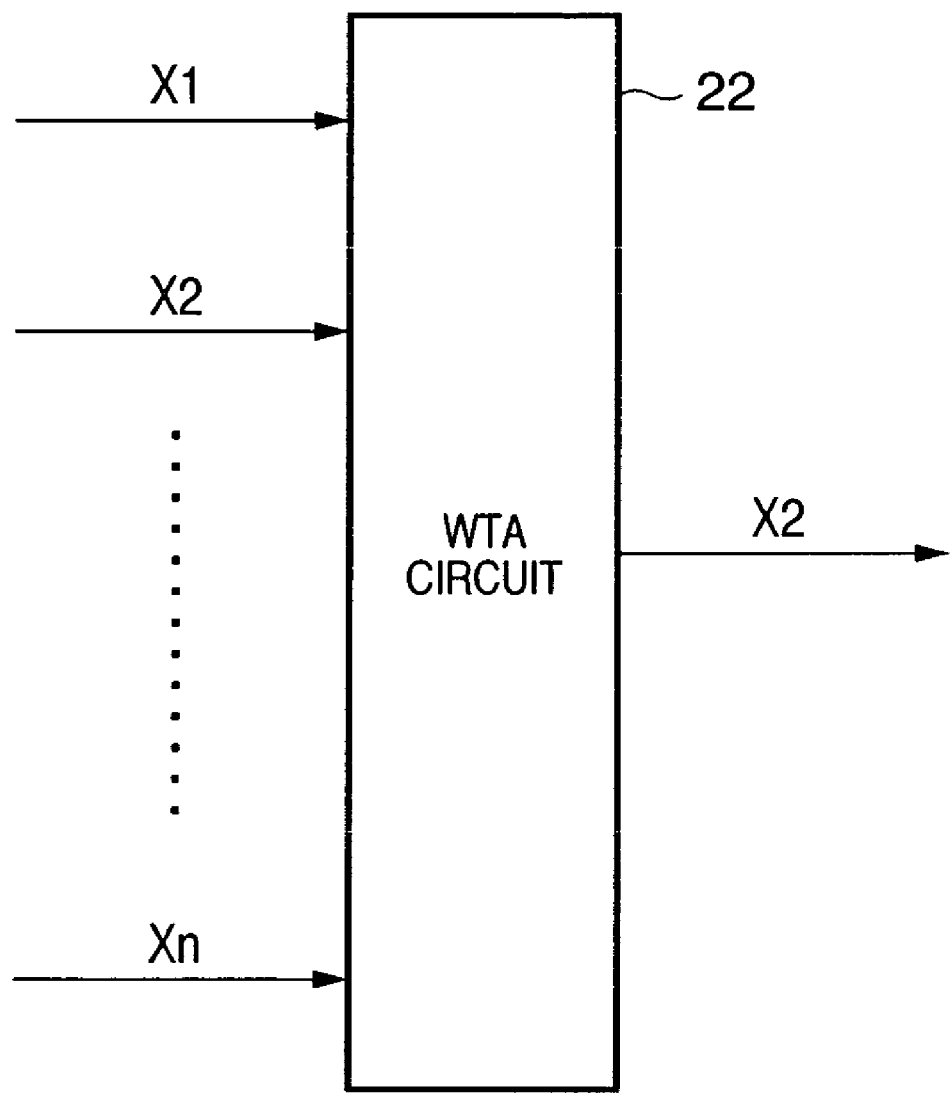
FIG. 8 is a block diagram showing an example of a sorting block according to the second embodiment.

FIG. 8 shows a sorting block 4 including a WTA (Winner-Take-All) circuit 22.

The processing of the product-sum operation method according to this embodiment will be described with reference to the above-described drawings.

The processing of the entire apparatus shown in FIG. 1 is the same as in the first embodiment, and a description thereof will be omitted. The processing of each of the input holding block 2, weight holding block 3, sorting block 4, and operation blocks in operation unit 1 different from the first embodiment will be described below. In this embodiment, the case with the pulse width/digital conversion block described in the first embodiment will be excluded.

As shown in FIG. 7, the input holding block 2 of this embodiment includes the capacitor 20 and output buffer 21. The value of an operand value Xi is held as a voltage value accumulated in the capacitor 20.

The operand values Xi held in the input holding block 2 are input to the switch block 5 in descending order of magnitude by the sorting block 4. In this embodiment, the sorting block 4 is implemented by using the WTA circuit 22, as shown in FIG. 8. The WTA circuit is short for a Winner-Take-All circuit and has a function of outputting an input value having a maximum value (or a minimum value may be output). When the operand values Xi are input to the WTA circuit 22, the operand value Xi having a maximum value is output. Next, when the group of operand values Xi except the previously output operand value Xi is input, the operand value Xi having the second largest value is output. By repeating this operation, the operand values are output in descending order of magnitude, and the sorting operation is executed.

In this embodiment, if there are the operand values Xi having the same value, they are output in an arbitrary order. Instead, an appropriate order may be set in advance.

At this time, the label each operand value has is also held simultaneously. As the holding circuit, either a digital memory or an analog memory which implements the same function may be used.

In this embodiment, an analog circuit is used as the sorting block 4. However, an associative memory may be used, as in the first embodiment. In this case, the output from the associative memory is D/A-converted and then input to operation unit 1. As the D/A conversion circuit which executes the D/A conversion, a circuit of any arrangement can be used when it has a function of converting a digital value into an analog value.

The above-described detailed circuit arrangement of the sorting block 4 is not the gist of the present invention. Any other circuit arrangement can be used if it can implement the same function.

Figure 9:
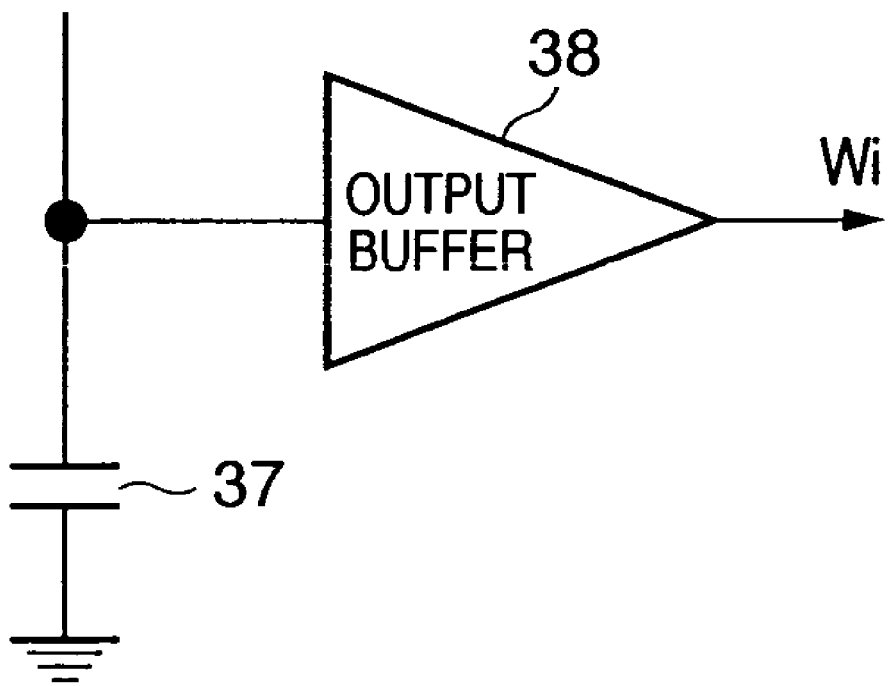
FIG. 9 is a block diagram showing an example of a weight holding block according to the second embodiment.

The weight holding block 3 will be described next. The weight holding block 3 includes a capacitor 37 and output buffer 38, like the input holding block 2, as shown in FIG. 9. The weight holding block 3 holds the value of an operand value Wi as a voltage value accumulated in the capacitor 37.

For the weight holding block 3, the value of the operand value Wi held in a digital memory (e.g., an SRAM) may be D/A-converted and held in the weight holding block 3 as shown in FIG. 9 as an analog value.

In this case, as the D/A conversion circuit, a circuit of any arrangement can be used when it has a function of converting a digital value into an analog value, like the above-described D/A conversion circuit when an associative memory is used in this embodiment.

Operation processing executed in predetermined operation block to which the operand value Xi and operand value Wi are input as analog voltage values will be described next. As shown in FIG. 6, each operation block according to this embodiment is formed as an analog operation circuit including the analog multiplier 17, capacitor 18, and output buffer 19.

The operand value Xi and operand value Wi are input to the analog multiplier 17 as analog voltages and Xi×Wi is operated. The value of the operand value Xi input to each operation block may remain unchanged or change between operations. The multiplication result of Xi×Wi is expressed by a charge amount and added and accumulated in the capacitor 18.

In this embodiment, the multiplication result by the analog multiplier 17 is assumed to be output as a charge amount. However, any other method of outputting the multiplication result as, e.g., a voltage value can be used as long as the same function as described above can be realized.

By repeating the above-described processing, the accumulation value of a plurality of multiplication results of Xi×Wi is held in the capacitor 18. When a predetermined number of accumulations are ended, the accumulation value is output through the output buffer 19.

As in the first embodiment, an analog voltage value corresponding to the operand value Xi is input to a predetermined operation block by switching the switch block in correspondence with the label of the operand value Xi, although there is the difference between a digital value and an analog value.

In addition, the operation processing is not executed in an operation block to which no operand value Xi is input, as in the first embodiment.

In this embodiment, the analog voltage value corresponding to the operand value Wi is switched by the switch block in accordance with the label of the operand value Xi and input to a predetermined operation block determined by the label, like the operand value Xi. As a method different from the embodiment, the predetermined operation block to which the analog voltage value corresponding to the operand value Wi should be input may be set in advance independently of the label of the operand value Xi, as in the first embodiment, although there is the difference between a digital value and an analog value.

As described above, the operand values Xi input to operation block as an analog voltage are input in descending order of magnitude by the sorting block 4. The operand values Xi having the same value are continuously input. For these reasons, as compared to a case in which the operand values Xi are input at random, the voltage variation becomes small, and the time lag and power consumption caused by the voltage variation can be reduced.

In this embodiment, the sorting block sorts the operand values Xi in descending order of magnitude. Even when the operand values Xi are sorted in ascending order of magnitude, the same effect as described above can be obtained.

Third Embodiment

Figure 10:
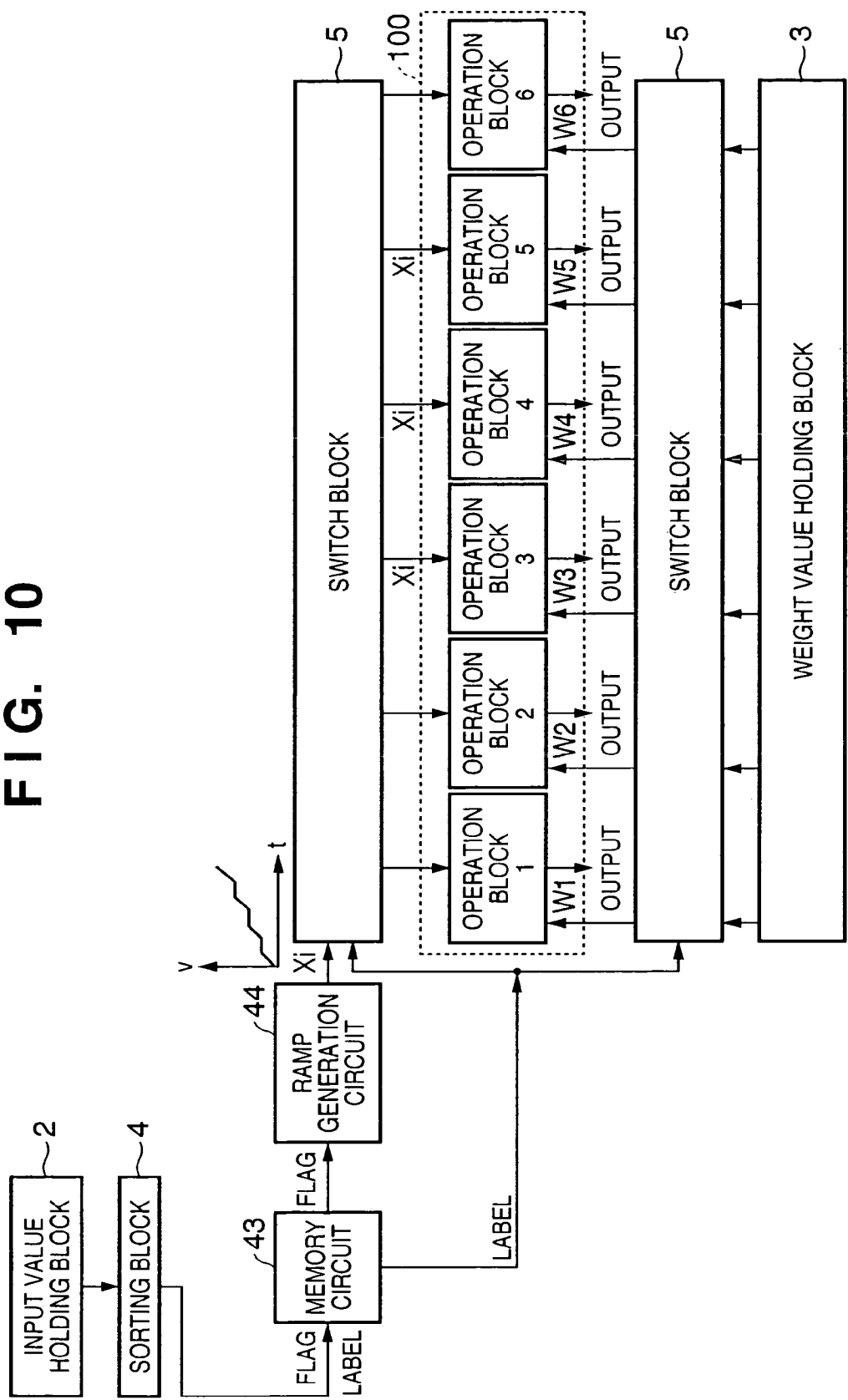
FIG. 10 is a block diagram showing an example of a product-sum operation circuit according to the third embodiment.

FIG. 10 shows the block arrangement of a product-sum operation circuit according to this embodiment.

In the arrangement shown in FIG. 10, a memory circuit 43 is connected to the subsequent stage of a sorting block 4. In addition, a ramp generation circuit 44 is connected to the subsequent stage of the memory circuit 43. The output from the ramp generation circuit 44 is input to a switch block 5. The memory circuit 43 of this embodiment includes an SRAM. An input value holding block 2 and the sorting block 4 include an associative memory circuit, as in the first embodiment.

Figure 11:
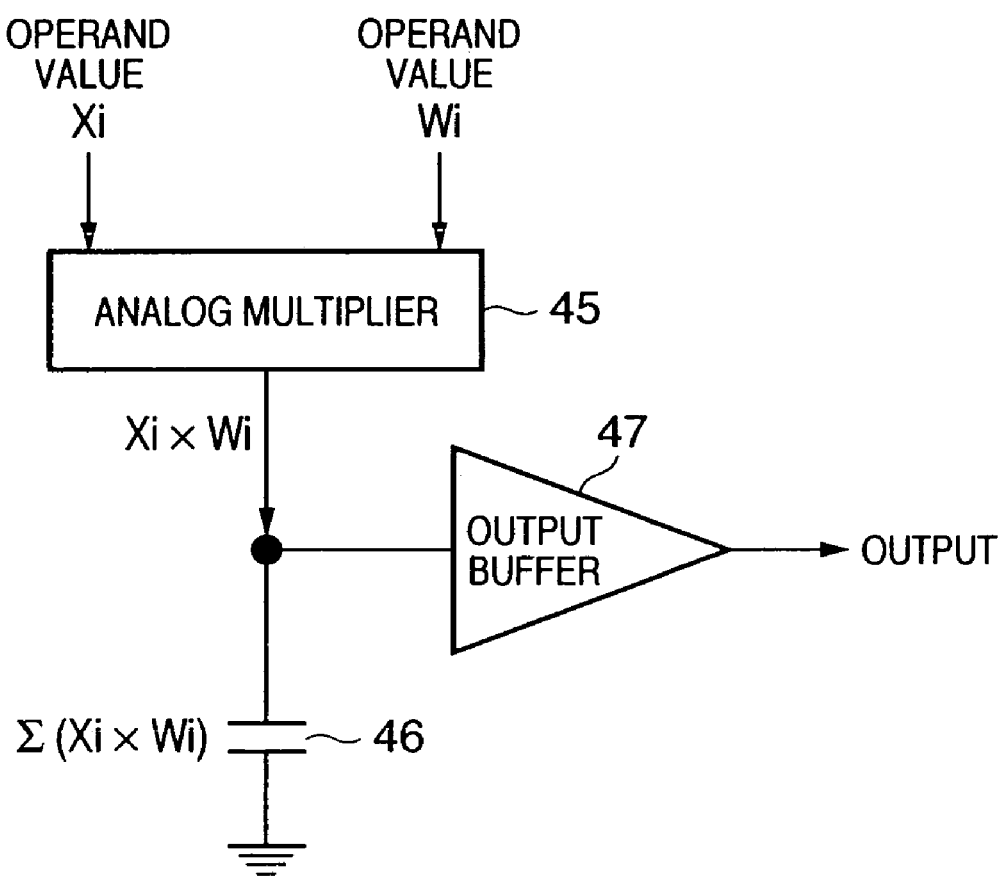
FIG. 11 is a block diagram showing an example of an analog operation circuit according to the third embodiment.
Figure 12:
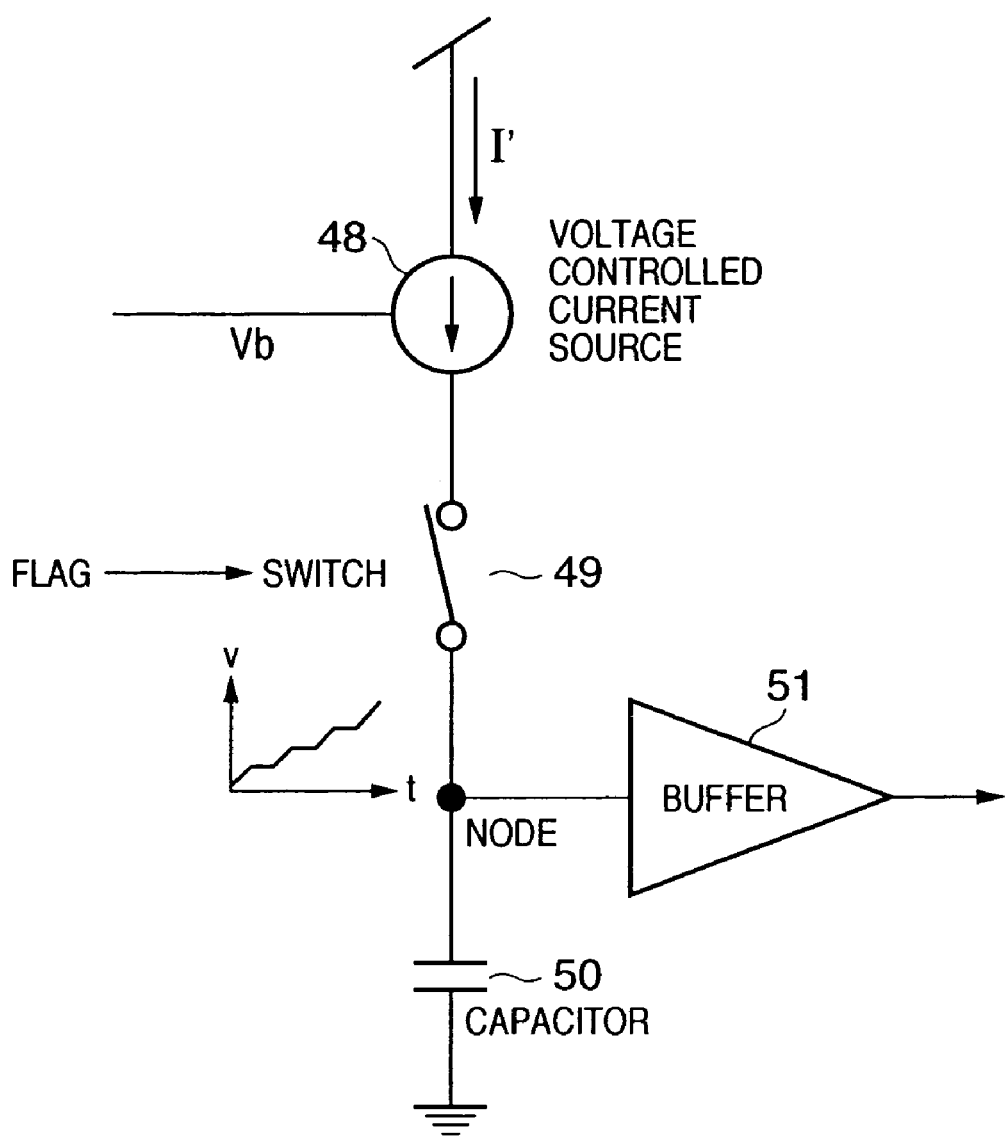
FIG. 12 is a block diagram showing an example of a ramp generation circuit according to the third embodiment.

FIG. 11 shows an analog operation circuit in which an operation block 1 is formed as an analog circuit. Operation blocks 2 to 6 can also have the same arrangement. As shown in FIG. 11, the analog operation circuit of this embodiment includes an analog multiplier 45, capacitor 46, and output buffer 47. FIG. 12 shows the arrangement of the ramp generation circuit 44.

The processing of the product-sum operation method according to this embodiment will be described with reference to the above-described drawings.

The associative memory circuit holds the values of operand values Xi and the labels i the operand values Xi have. As its general function, the associative memory circuit searches the operand values Xi in descending order of magnitude and outputs their labels i.

Simultaneously, for the search value in searching for operand values Xi in descending order of magnitude, only when the search value is decreased by one unit, the flag of a pulse signal is output (in this embodiment, flag=1 is output).

As a method different from this embodiment, for the search value in searching the operand values Xi in ascending order of magnitude, only when the search value is increased by one unit, the flag of a pulse signal may be output.

As shown in FIG. 10, the labels and flags are input to and held in the SRAM at the subsequent stage in correspondence with each other in searching order (i.e., in descending order of magnitude). Subsequently, the SRAM outputs the labels and flags in the holding order (i.e., in descending order of magnitude). The labels are input to the switch block 5. The flags are input to the ramp generation circuit 44.

The ramp generation circuit 44 will be described next. The ramp generation circuit 44 includes a voltage controlled current source 48 biased to a predetermined voltage value Vb, a capacitor 50, a switch 49, and a buffer 51, as shown in FIG. 12.

When the flag is input to the ramp generation circuit 44 to turn on the switch 49, a predetermined current is supplied from the voltage controlled current source 48 and accumulated in the capacitor 50. The flag is set to 1 only when the search value in the associative memory decreases by one unit. For this reason, the switch 49 is turned on when the search value decreases by one unit.

Hence, the voltage value of the node in the ramp generation circuit 44 changes as indicated by the waveform shown in FIG. 12. More specifically, voltage values which correspond to the operand values Xi in descending order of magnitude and monotonically increase are generated ("monotonically" also means a case in which a constant value is exhibited over time. This also applies to the following description).

As the voltage values corresponding to the operand values Xi in descending order of magnitude, voltage values which monotonically increase are set. However, voltage values which monotonically decrease may be set depending on the analog multiplier to be described later.

This can be implemented by, in the ramp generation circuit 44, removing charges from the capacitor 50 which accumulates predetermined charges in the initial state by the voltage controlled current source.

Subsequently, the monotonically increasing voltage value generated by the ramp generation circuit 44 is input to the switch block 5. The switch block 5 executes switching in correspondence with the input label and inputs the monotonically increasing voltage value to predetermined operation block determined by the label.

Operation block 1 will be considered. Only when the operation block 1 coincides with the predetermined operation block determined by the label, the monotonically increasing voltage value is input. When the label output from the memory circuit 43 changes, and operation block 1 does not coincide with the predetermined operation block determined by the label, switching is executed, and the monotonically increasing voltage value is not input.

That is, in operation block 1, the monotonically increasing voltage value is sampled in accordance with the output timing of the label. This means that an appropriate voltage value corresponding to the operand value Xi is input at the switching timing by the label.

The operation processing is not executed in operation block 1 to which no operand value Xi is input, as in the second embodiment. The processing steps in the weight holding block 3 are the same as in the second embodiment, and a description thereof will be omitted.

Subsequently, in the analog operation circuit, as shown in FIG. 11, the operand value Xi and operand value Wi input to the analog multiplier 45 are multiplied. Charges corresponding to the operation result are accumulated in the capacitor 46. The processing in the analog operation circuit is the same as in the second embodiment, and a description thereof will be omitted.

In this embodiment, the operand value Xi may be input to the input value holding block 2 as a PWM signal. In this case, the PWM signal input processing steps are the same as in the first embodiment, and a description thereof will be omitted.

Fourth Embodiment

In this embodiment, a circuit in which a circuit arrangement different from the second and third embodiments is used as an analog operation circuit will be described. Arrangements except the analog operation circuit are the same as in the second and third embodiments.

Figure 13:
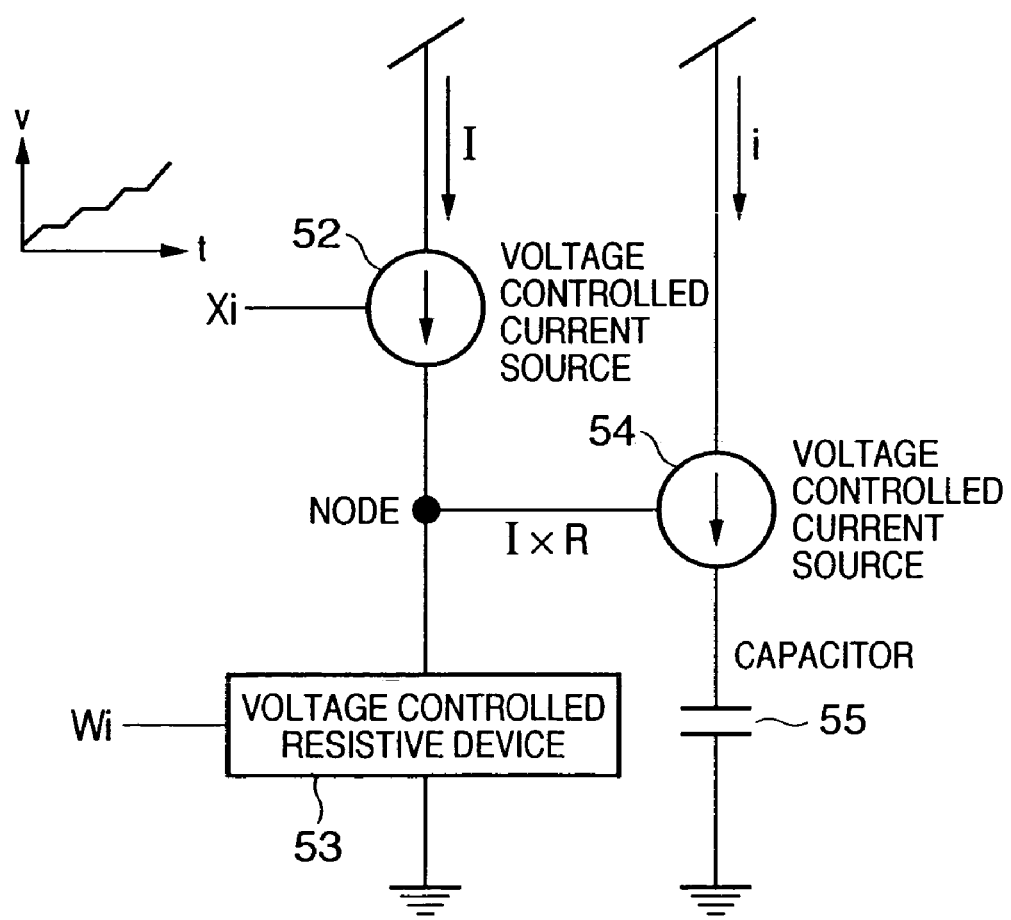
FIG. 13 is a block diagram showing an example of an analog operation circuit according to the fourth embodiment.

FIG. 13 shows the analog operation circuit to be described in this embodiment. As shown in FIG. 13, the analog operation circuit of this embodiment includes a voltage controlled current source 52, voltage controlled resistive device 53, and capacitor 55. As an operand value Xi, a voltage value which monotonically increases over time is input to the voltage controlled current source 52 as a control voltage.

The voltage value input here, which monotonically increases over time, is generated by causing a WTA circuit 56 to output the voltage values corresponding to the operand values Xi in descending order of magnitude as continuous analog voltage value, as shown in FIG. 15.

The voltage value which monotonically increases over time may be generated by using a memory circuit and a ramp generation circuit, as in the third embodiment. In this case, the input value holding block and sorting block include digital circuits, as in the third embodiment.

In this case, the operand value Xi may be input to the input value holding block as a PWM signal. The PWM signal input processing steps in this case are the same as in the first embodiment, and a description thereof will be omitted.

Figure 14:
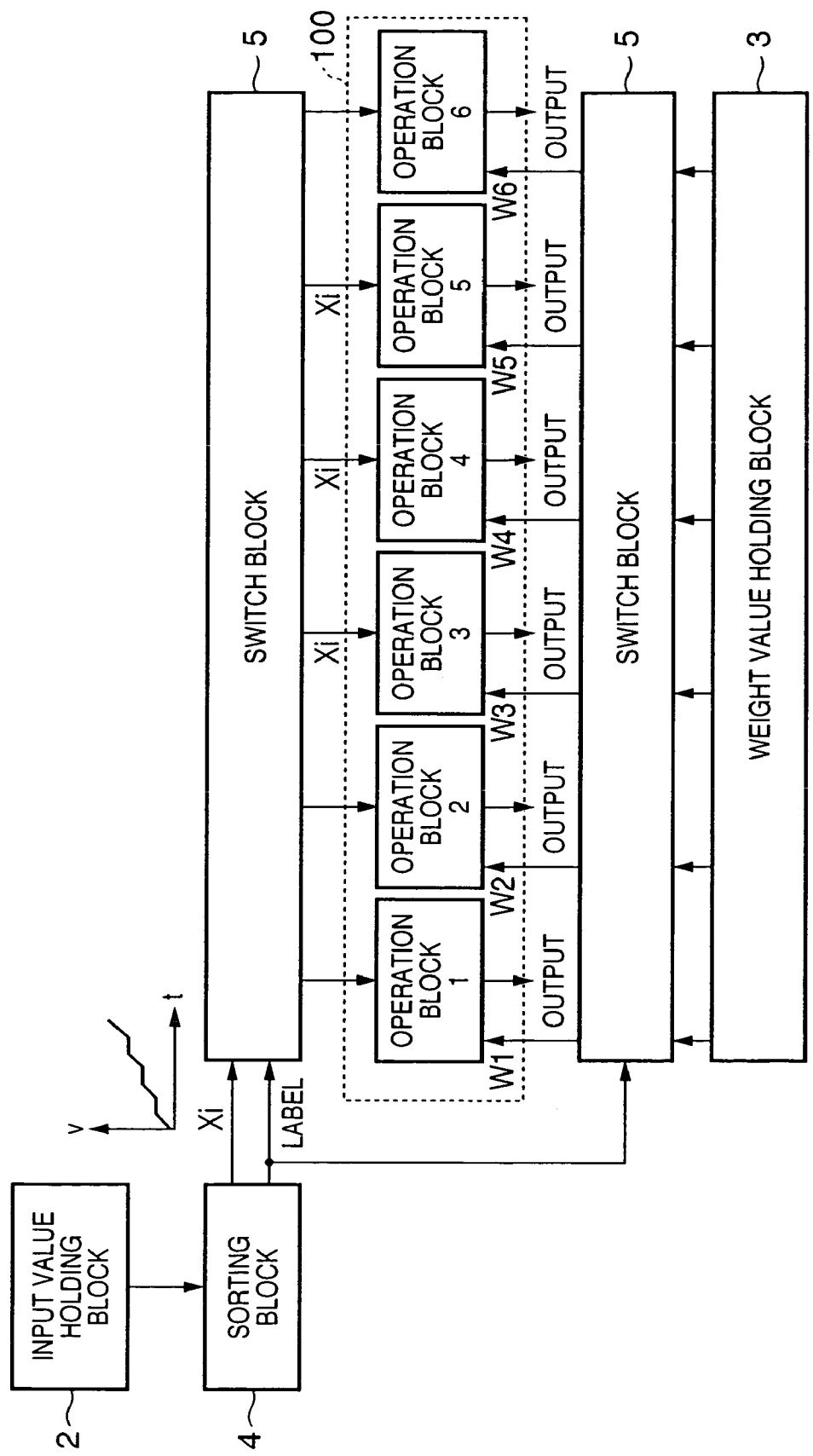
FIG. 14 is a block diagram showing an example of a product-sum operation circuit according to the fourth embodiment.

Subsequently, as shown in FIG. 14, the voltage value output from the WTA circuit 56 (sorting block 4), which monotonically increases over time, is input to an operation unit 100 through a switch block 5. In the analog operation circuit, the monotonically increasing voltage value is referred to at a certain timing. Accordingly, as described in the second or third embodiment, voltage values corresponding to the operand values Xi are input in descending order of magnitude as the control voltage of the voltage controlled current source 52 of the analog operation circuit corresponding to the label. The voltage controlled current source 52 may be formed by using the saturation characteristic of a MOS transistor or may have a differential structure.

An analog voltage value corresponding to an operand value Wi is input to the voltage controlled resistive device 53 of the analog operation circuit as a control voltage. The voltage controlled resistive device 53 indicates a predetermined resistance value R in accordance with the input analog voltage value. The voltage controlled resistive device 53 may be formed by using the linear characteristic of a MOS transistor or may have a differential structure.

Subsequently, a current I of the voltage controlled current source 52 determined by the analog voltage value corresponding to the operand value Xi referred to at a predetermined operation timing flows to the voltage controlled resistive device 53 (the resistance value at this time is R) determined by the analog voltage value corresponding to the operand value Wi. Then, an operation result of Xi×Wi is observed as a voltage value corresponding to I×R in the node shown in FIG. 13. The voltage of the node is further input to a voltage controlled current source 54 as a control voltage. Accordingly, a current i determined by I×R flows to the capacitor.

The voltage controlled current source 54 may be formed by using the saturation characteristic of a MOS transistor or may have a differential structure. When the switching interval of the switch block 5 is set to a predetermined time, charges corresponding to I×R×(switching interval) can be accumulated in the capacitor 55.

When the above-described operation is repeated, the accumulation result is held in the capacitor 55 as a charge amount.

In this way, the same operation as in the second and third embodiments can be performed by the product-sum operation circuit shown in FIG. 14. In this embodiment, the analog voltage corresponding to the operand value Xi is a voltage value which monotonically increases over time. Depending on the purpose of operation, a voltage value which monotonically decreases over time may be used.

The analog voltage value corresponding to the operand value Xi is input to a predetermined operation block by switching the switch block 5 in correspondence with the label of the operand value Xi, as in the second and third embodiments. In addition, the operation processing is not executed in the operation block 1 to which no operand value Xi is input, as in the second and third embodiments.

In this embodiment, the analog voltage value corresponding to the operand value Wi is switched by the switch block 5 in accordance with the label of the operand value Xi and input to the predetermined operation block determined by the label, like the operand value Xi. As a method different from this embodiment, the predetermined operation block to which the analog voltage value corresponding to the operand value Wi should be input may be set in advance independently of the label of the operand value Xi, as in the second and third embodiments.

Fifth Embodiment

Figure 16:
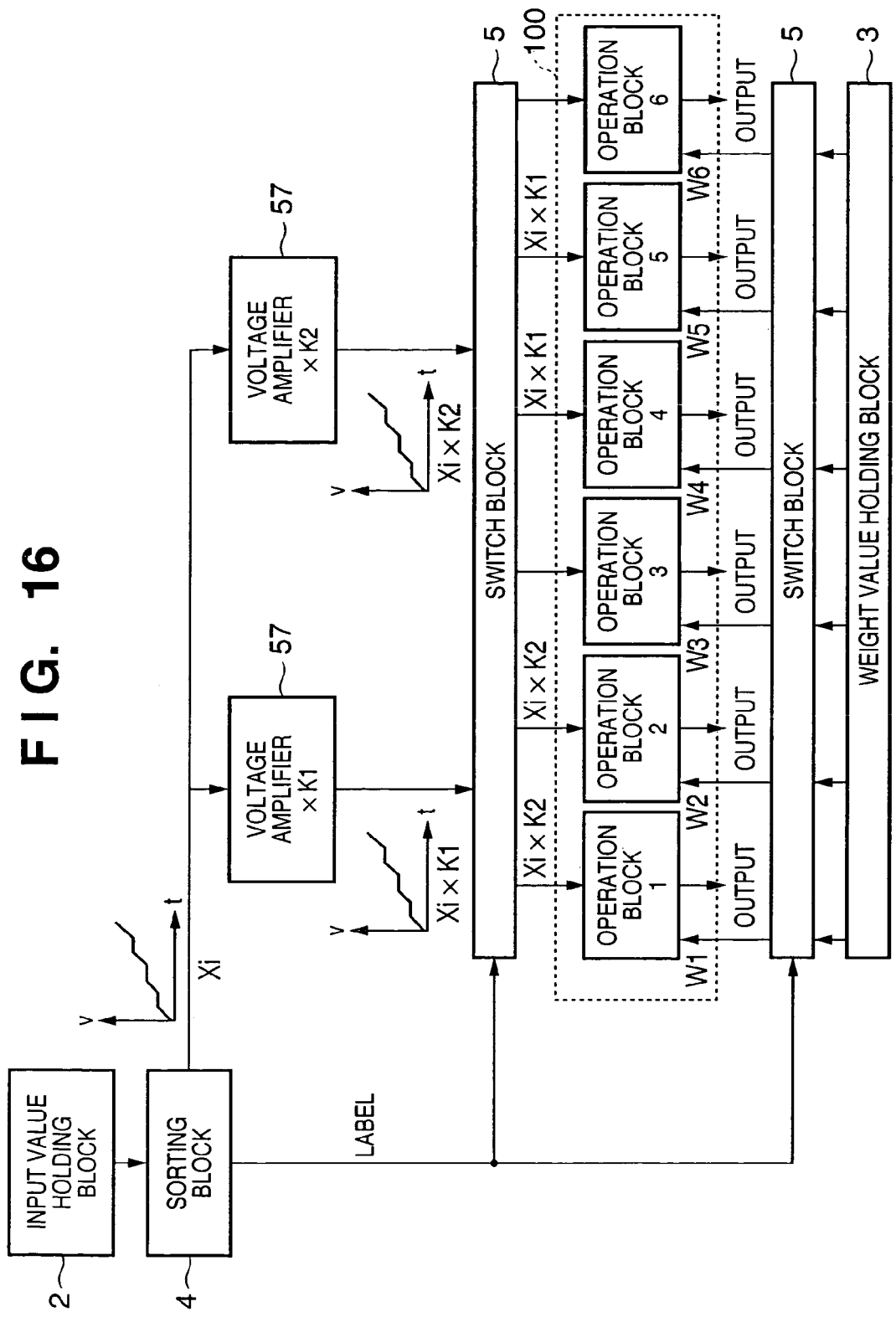
FIG. 16 is a block diagram showing an example of a product-sum operation circuit according to the fifth embodiment.

FIG. 16 shows the arrangement of this embodiment. This embodiment is different from the third or fourth embodiment in that the analog voltage value described in the third or fourth embodiment, which monotonically increases over time, is multiplied by a coefficient Ki so that an operation of multiplying an operand value Xi by the predetermined coefficient Ki can be executed.

In this embodiment, only points different from the third or fourth embodiment will be explained. The remaining points are the same as in the third or fourth embodiment, and a description thereof will be omitted.

As shown in FIG. 16, that the analog voltage value which monotonically increases is multiplied by the coefficient Ki means that a voltage value (i.e., the operand value Xi) referred to at a predetermined operation timing is multiplied by the predetermined coefficient Ki. Hence, when the analog voltage value input to operation unit 1, which monotonically increases, is multiplied by the coefficient Ki, multiplication of three terms Ki×Xi×Wi can be operated.

As shown in FIG. 16, when analog voltage values multiplied by the coefficients Ki with different values are input in parallel, multiplication of three different terms can be operated in parallel in respective operation blocks.

To change the coefficient Ki corresponding to each monotonically increasing analog voltage value, voltage amplifiers 57 corresponding to the coefficients Ki are arranged at the subsequent stage of a sorting block 4 (a WTA circuit or a ramp generation circuit). In the example shown in FIG. 16, the voltage amplifiers 57 are arranged at the subsequent stage of a WTA circuit. When the voltage amplifiers 57 are arranged at the subsequent stage of a ramp generation circuit, the voltage amplifiers 57 corresponding to the coefficients Ki are arranged for a monotonically increasing analog voltage value output from a ramp generation circuit 44 in FIG. 10, as shown in FIG. 10.

In this embodiment, an analog voltage value which monotonically increases is used. The same operation as described above can be executed even when an analog voltage value which monotonically decreases is used. The analog voltage value corresponding to the operand value Xi×coefficient Ki, which monotonically increases, is input to a predetermined operation block by switching a switch block 5 in correspondence with the label of the operand value Xi, as in the third and fourth embodiments.

In this embodiment, the analog voltage value corresponding to an operand value Wi is switched by the switch block 5 in accordance with the label of the operand value Xi and input to the predetermined operation block determined by the label, like the operand value Xi. As a method different from this embodiment, the predetermined operation block to which the analog voltage value corresponding to the operand value Wi should be input may be set in advance independently of the label of the operand value Xi, as in the third and fourth embodiments.

In this embodiment, the case in which the operand value Xi is input to an input value holding block 2 as a PWM signal is the same as in the third and fourth embodiments.

Sixth Embodiment

The sixth embodiment will be described with reference to FIGS. 17 and 18. This embodiment is different from the third or fourth embodiment in that the analog voltage value described in the third or fourth embodiment, which monotonically increases over time, is multiplied by a coefficient Ki so that an operation of multiplying an operand value Xi by the predetermined coefficient Ki can be executed.

In this embodiment, only points different from the third or fourth embodiment will be explained. The remaining points are the same as in the third or fourth embodiment, and a description thereof will be omitted.

Figure 17:
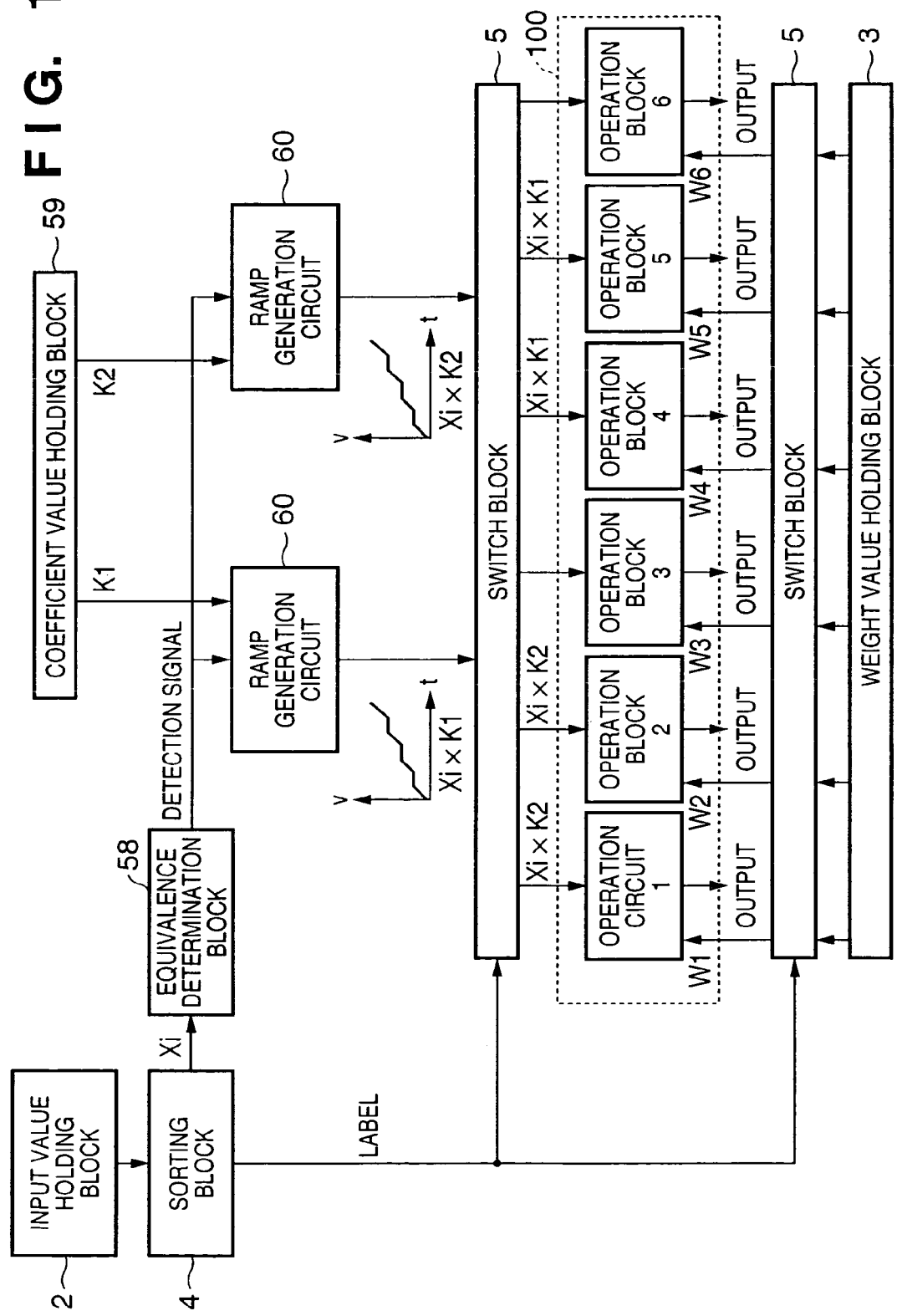
FIG. 17 is a block diagram showing an example of a product-sum operation circuit according to the sixth embodiment.
Figure 18:
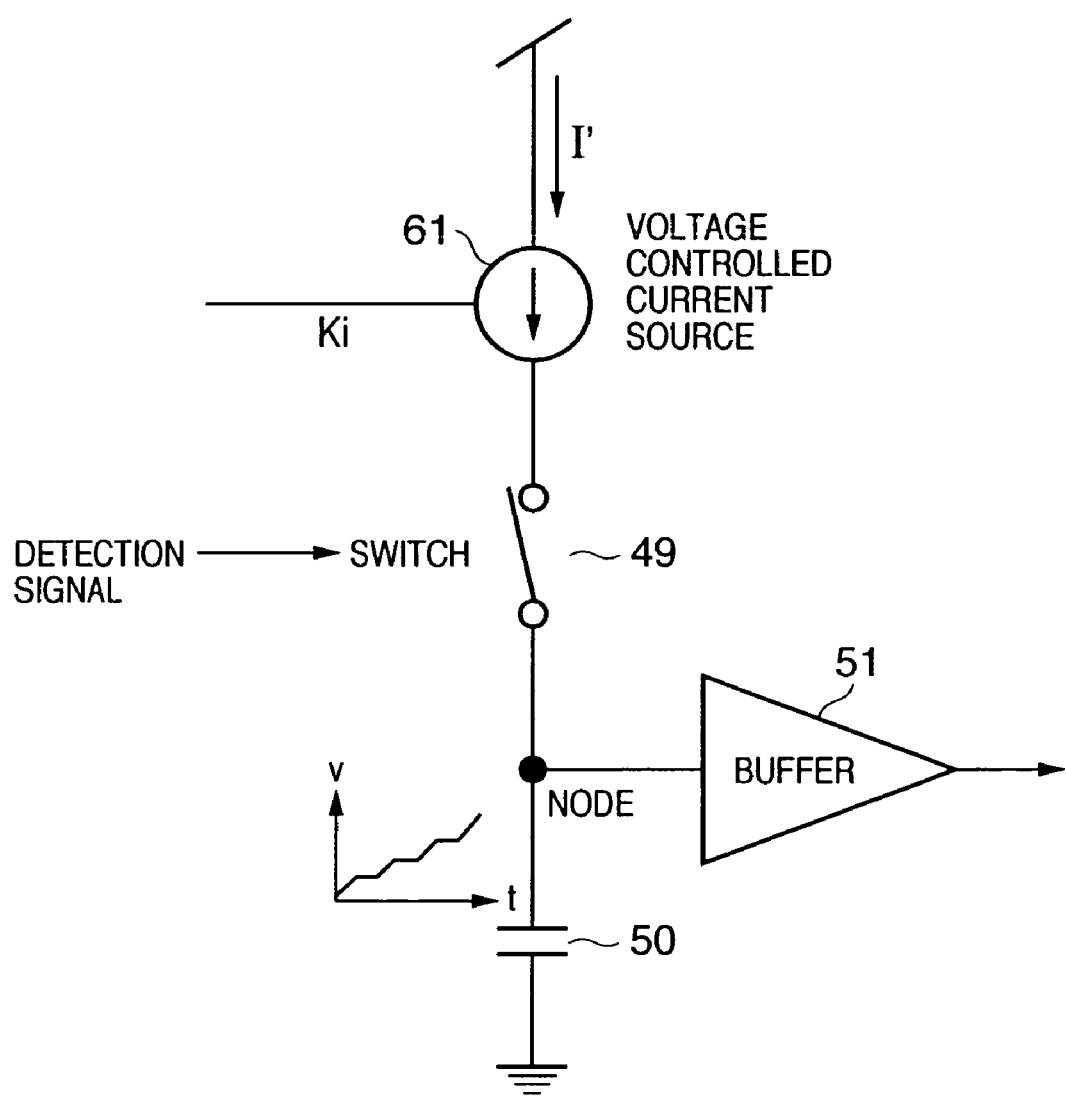
FIG. 18 is a block diagram showing an example of a ramp generation circuit according to the sixth embodiment.

Referring to FIG. 17, an associative memory is used as a sorting block 4, as in the first embodiment, to sort the operand values Xi in descending order of magnitude. An equivalence determination block 58 related to the operand values Xi is connected to the subsequent stage of the associative memory. The equivalence determination block 58 incorporates a memory function such as a register and stores the value of the operand value Xi previously output from the associative memory.

When a next operand value Xi' output from the associative memory is input to the equivalence determination block 58, the equivalence determination block 58 compares the operand value Xi' input this time with the previously input operand value Xi. If the two operand values are different, a detection signal which turns on the switch of a ramp generation circuit 60 (to be described later) is output. If the two operand values equal each other no detection signal is output. Hence, the switch of the ramp generation circuit 60 remains OFF.

The operation processing in operation unit 1 is executed in the same way as in the third or fourth embodiment. The voltage value input to operation unit 1, which monotonically increases over time, is generated by the ramp generation circuit shown in FIG. 18.

In the ramp generation circuit 60, a voltage value corresponding to the coefficient Ki is supplied to a voltage controlled current source 61 as a control voltage. Accordingly, a predetermined current flows, and charges are accumulated in a capacitor 50. A switch 49 of the ramp generation circuit 60 is turned on by the detection signal from the equivalence determination block 58, as described above.

More specifically, when the output value from the associative memory equals the preceding output value, the ramp generation circuit 60 turns off the switch 49 to stop the charge accumulation operation in the capacitor 50. Only when the output value from the associative memory is different from the preceding output value, the switch 49 is turned on, and the voltage value of the node changes as shown in FIG. 18.

At this time, when the voltage value corresponding to the coefficient Ki is appropriately set, the monotonically increasing voltage value can be multiplied by the coefficient Ki, as described in the fifth embodiment. When the voltage value is input to the analog operation circuit through a buffer 51, multiplication of three terms Ki×Xi×Wi can be operated, as in the fifth embodiment. The remaining operation processing is the same as in the third or fourth embodiment, and a description thereof will be omitted.

The voltage controlled current source 61 may be formed by using the saturation characteristic of a MOS transistor or may have a differential structure. The ramp generation circuit 60 may use any other circuit arrangement when it can realize the same function. In this embodiment, an analog voltage value which monotonically increases is used. However, the same operation as described above can be executed even when an analog voltage value which monotonically decreases is used.

The analog voltage value corresponding to the operand value Xi×coefficient Ki, which monotonically increases, is input to a predetermined operation block by switching the switch block 5 in correspondence with the label of the operand value Xi, as in the third and fourth embodiments.

In this embodiment, the analog voltage value corresponding to an operand value Wi is switched by a switch block 5 in accordance with the label of the operand value Xi and input to a predetermined operation block determined by the label, like the operand value Xi. As a method different from this embodiment, the predetermined operation block to which the analog voltage value corresponding to the operand value Wi should be input may be set in advance independently of the label of the operand value Xi, as in the third and fourth embodiments. The case in which the operand value Xi is input to an input value holding block 2 as a PWM signal is the same as in the third and fourth embodiments.

Seventh Embodiment

The seventh embodiment will be described with reference to FIGS. 19 and 20. This embodiment has the same arrangement as the third embodiment except that outputs from a coefficient value holding block 59 are input to ramp generation circuits 62. In this embodiment, only points different from the third embodiment will be explained. The remaining points are the same as in the third embodiment, and a description thereof will be omitted.

Figure 19:
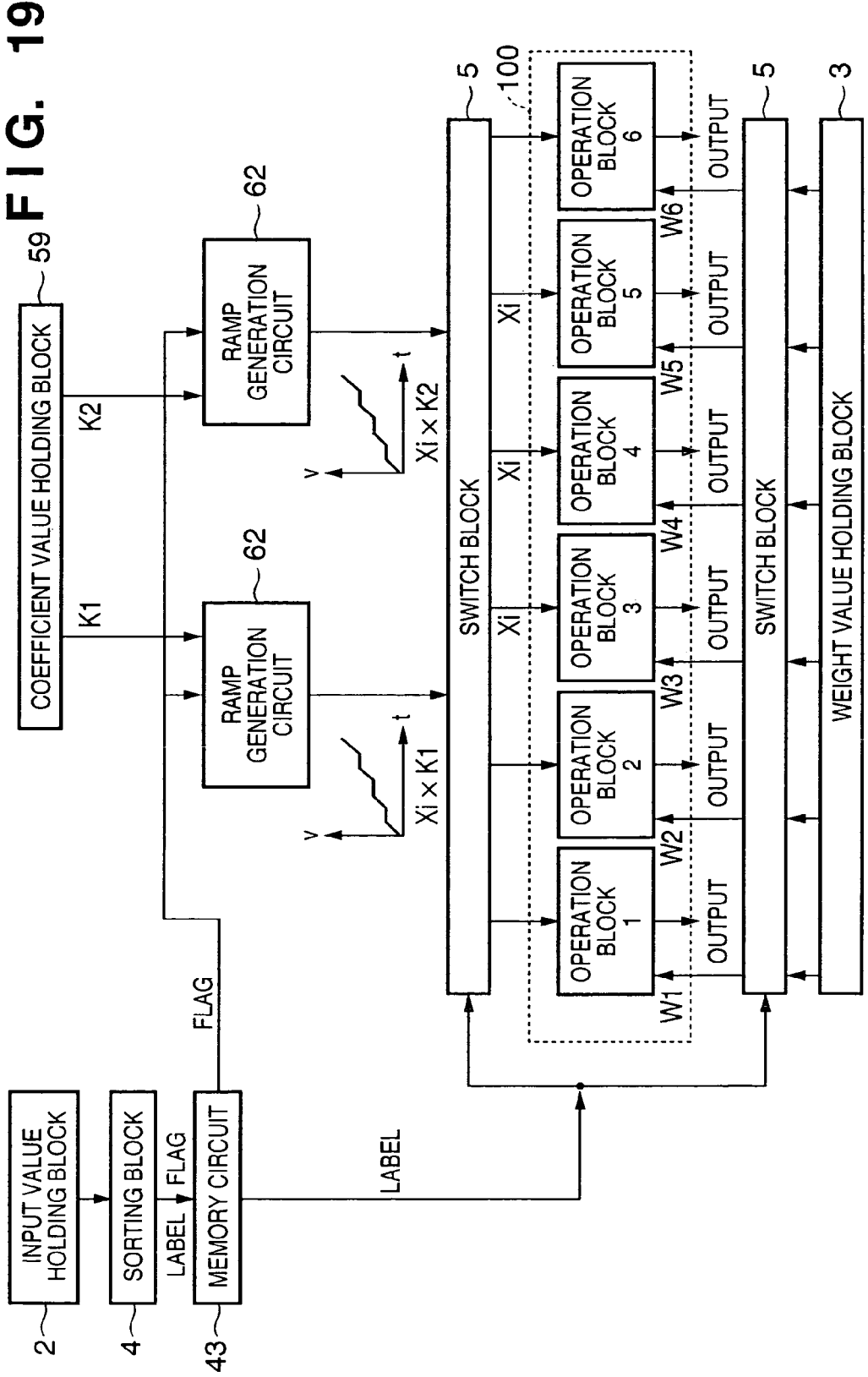
FIG. 19 is a block diagram showing an example of a product-sum operation circuit according to the seventh embodiment.
Figure 20:
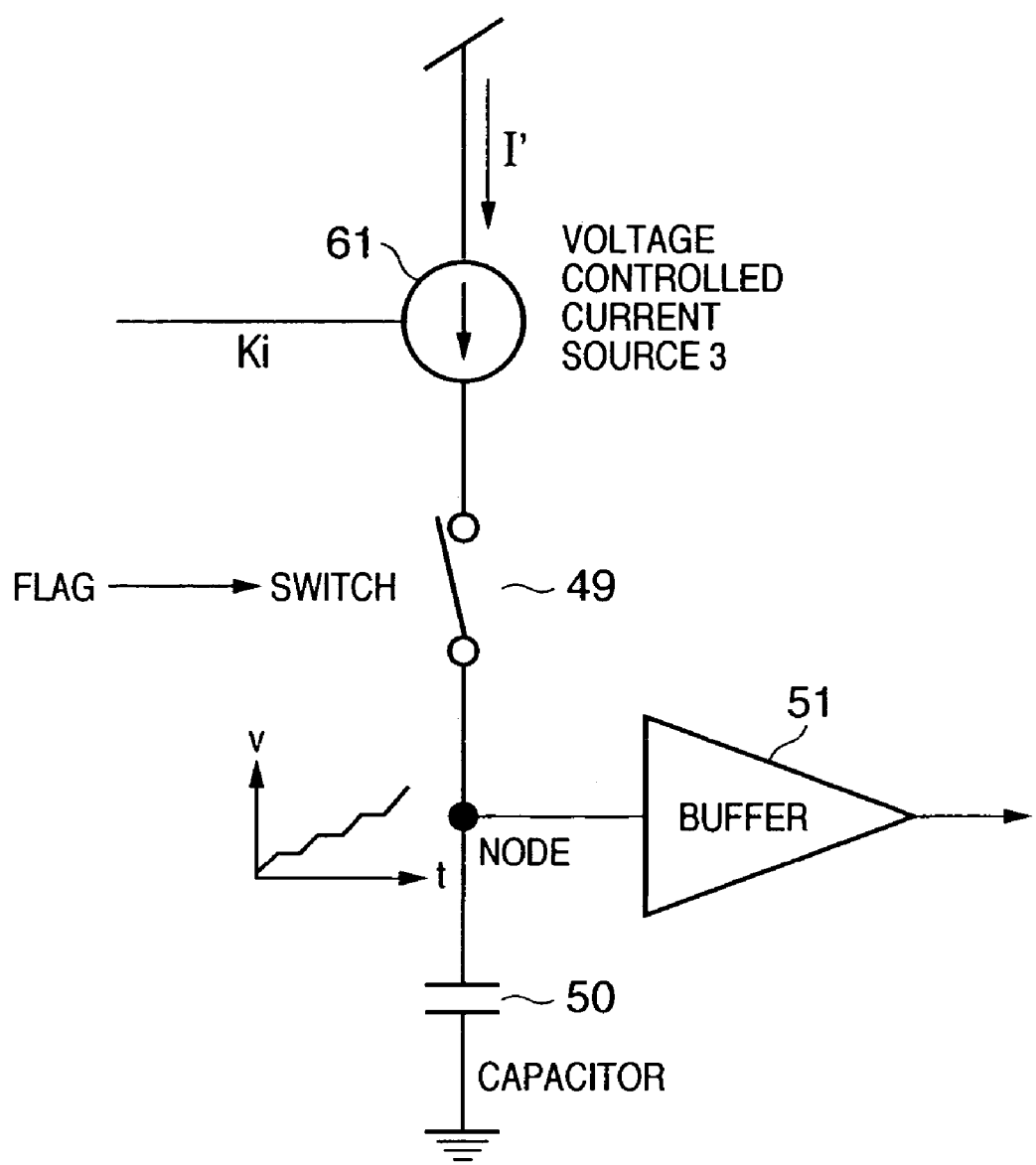
FIG. 20 is a block diagram showing an example of a ramp generation circuit according to the seventh embodiment.

As shown in FIG. 19, the coefficient value holding block 59 inputs voltage values corresponding to coefficients Ki to the ramp generation circuits 62. In each ramp generation circuit, as shown in FIG. 20, a voltage value corresponding to the coefficient Ki is supplied to the gate of a voltage controlled current source 61 so that a predetermined current corresponding to the coefficient Ki flows to the voltage controlled current source 61, unlike FIG. 12. That is, this embodiment is different from the third embodiment in that the current amount of the voltage controlled current source 61 can be controlled by the coefficient Ki held in the coefficient value holding block 59.

A change in current value of the voltage controlled current source 61 corresponds to a change in charge amount per unit time accumulated in a capacitor 50. This means that the gradient of the change in voltage value of the node with respect to time changes. This corresponds to multiplying a monotonically increasing voltage value by the coefficient Ki, as described in the fifth or sixth embodiment. When the voltage value is input to the analog operation circuit through a buffer 51, multiplication of three terms Ki×Xi×Wi can be operated, as in the fifth or sixth embodiment.

In this embodiment, the case in which an operand value Xi is input to an input value holding block 2 as a PWM signal is the same as in the third embodiment.

Eighth Embodiment

The eighth embodiment will be described with reference to FIGS. 21 to 24.

Figure 21:
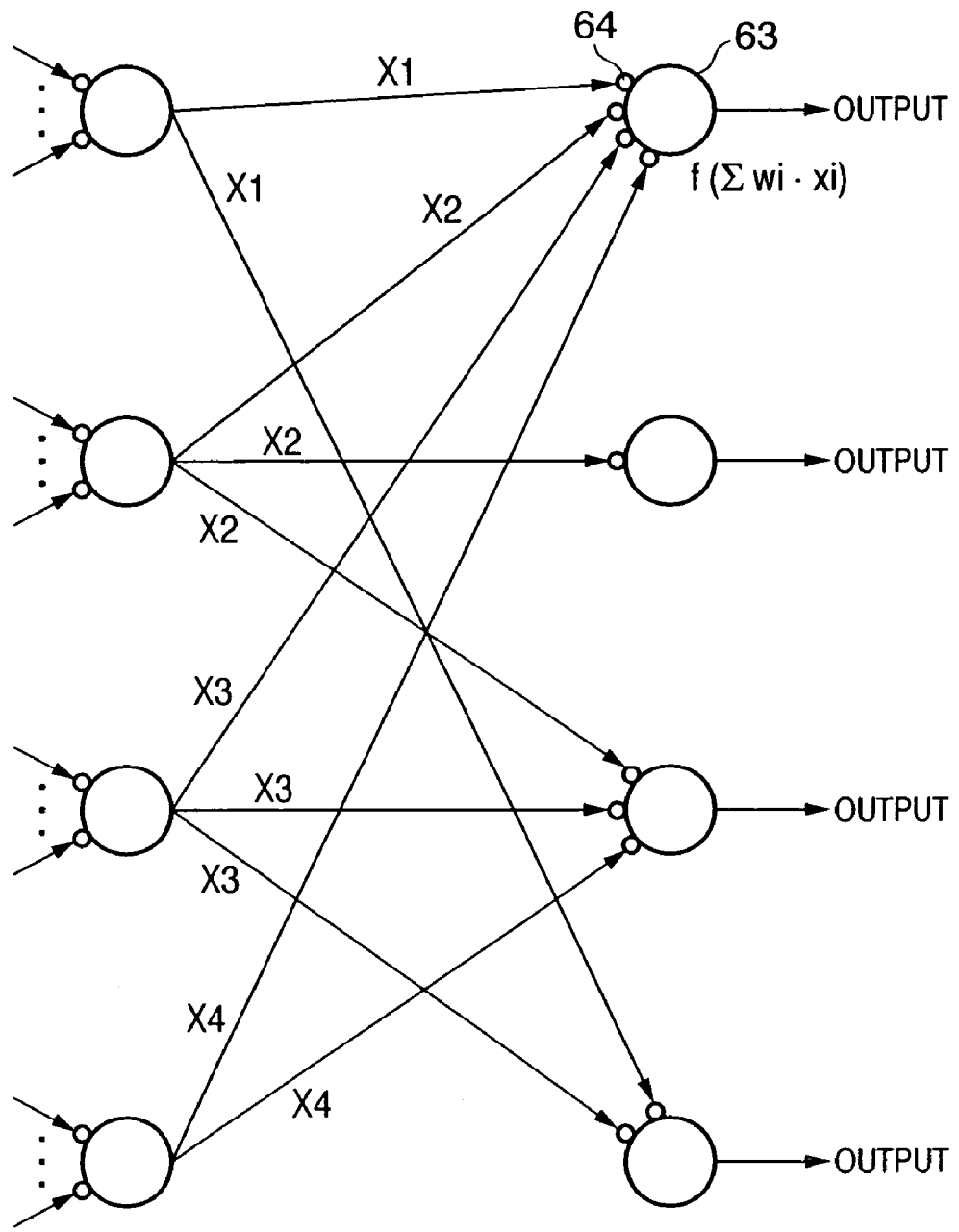
FIG. 21 is a view showing a neural network model.
Figure 22A:
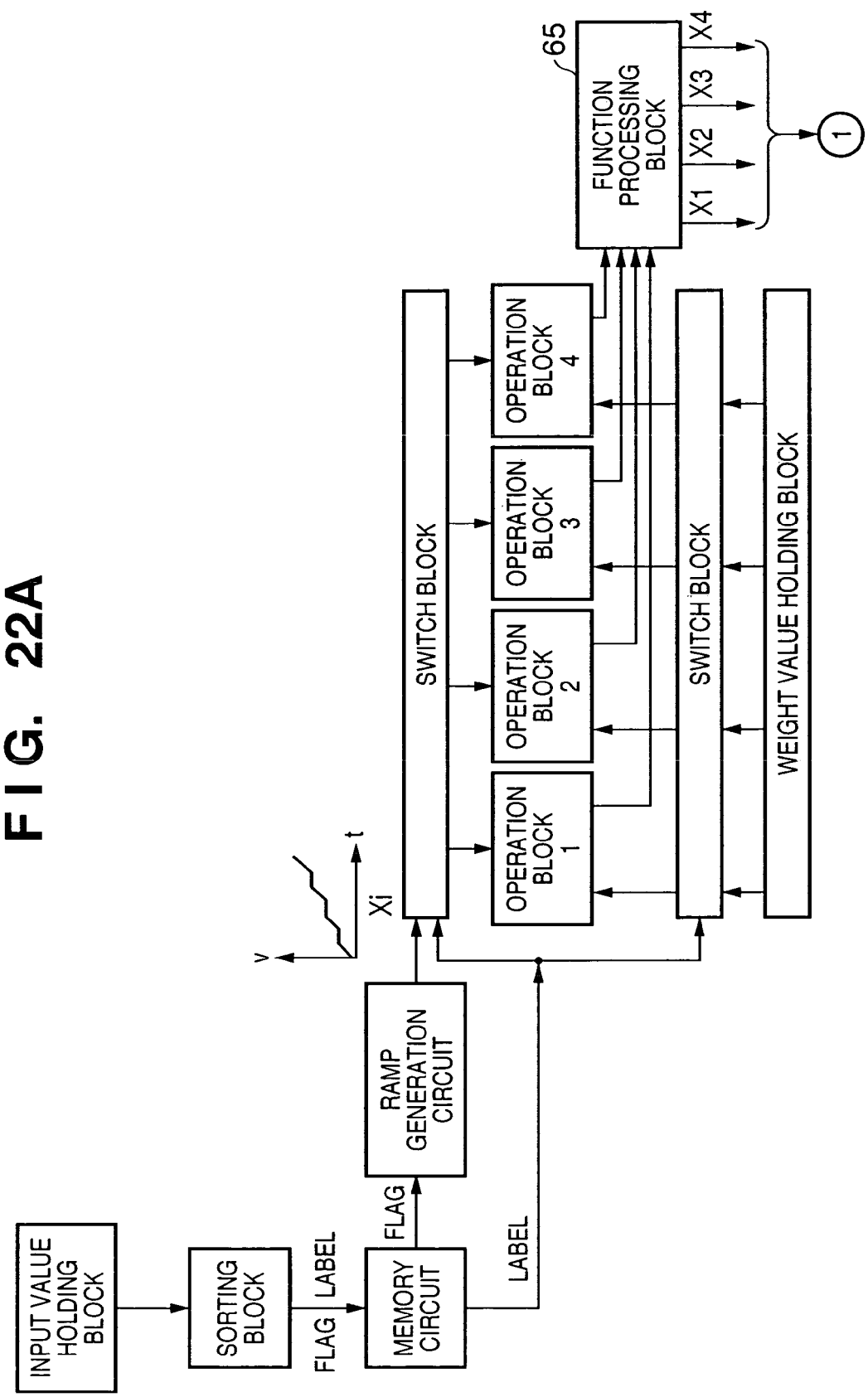
FIGS. 22A and 22B are block diagrams showing an example of a product-sum operation circuit according to the eighth embodiment.
Figure 22B:
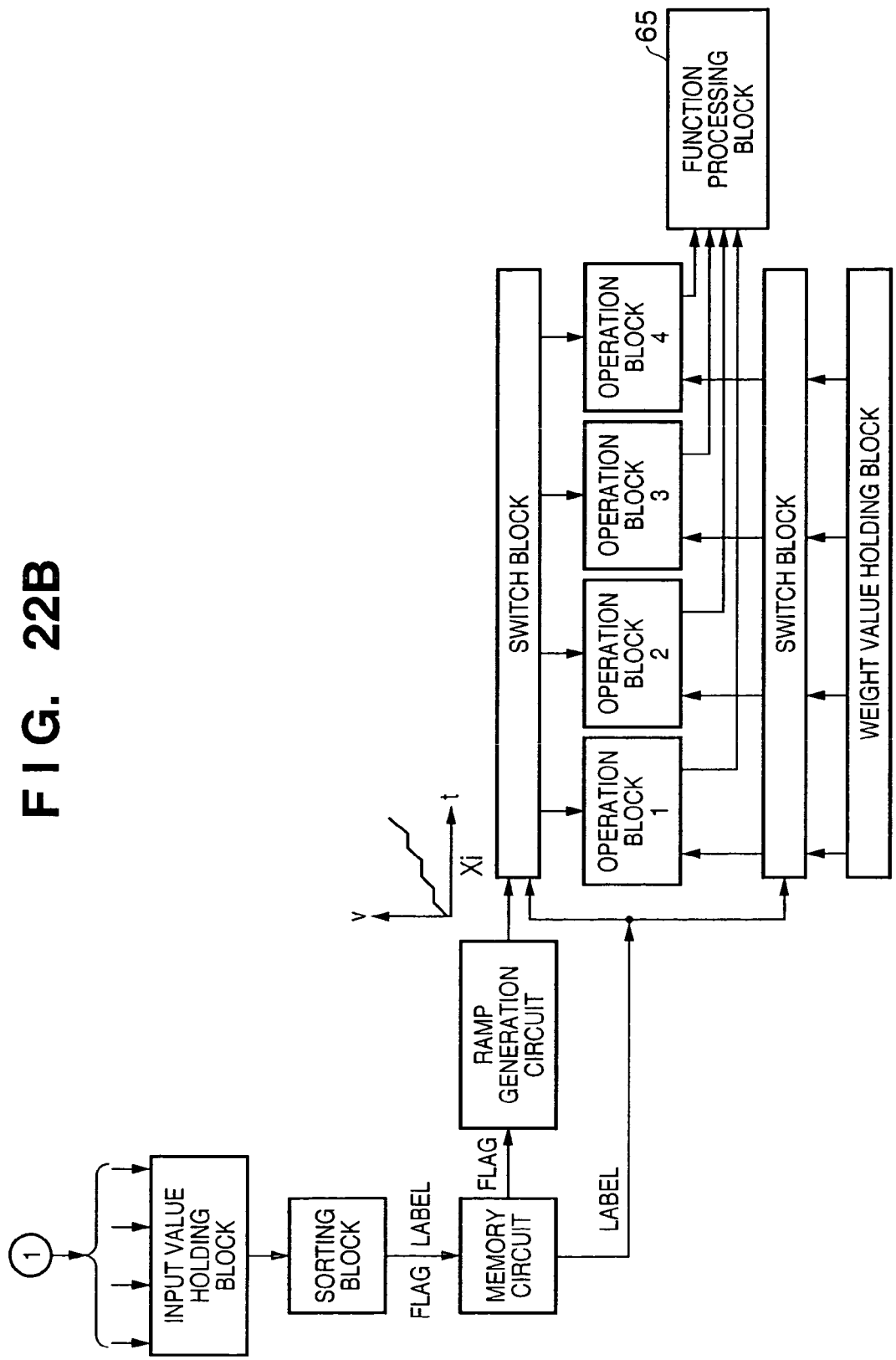

FIG. 21 shows a neural network model according to this embodiment. FIGS. 22A and 22B show the arrangement of an operation processing block when the product-sum operation method described in the first, second, third, and fourth embodiments is applied to the neural network of this embodiment (FIGS. 22A and 22B show circuits to which the product-sum operation method described in the third embodiment is applied).

As shown in FIGS. 22A and 22B, the processing blocks of the neural network according to this embodiment include the processing blocks by the product-sum operation method described in the first, second, third, and fourth embodiments.

As shown in FIG. 21, as the model of a neuron element in the neural network, generally, a neuron element 63 weights the output values from a plurality of neuron elements at the preceding stage by a synaptic weight 64 and calculates the sum of the weighted values to determine the internal state value of the neuron element 63.

The neuron element circuit according to this embodiment uses, as the model of the neuron element, the operation processing block described in the first, second, third, or fourth embodiment. More specifically, an operand value Xi described in the first, second, third, or fourth embodiment corresponds to the output value from the neuron element at the preceding stage, and an operand value Wi corresponds to the synaptic weight value 64 to determine the internal state value of the neuron element 63.

Figure 23:
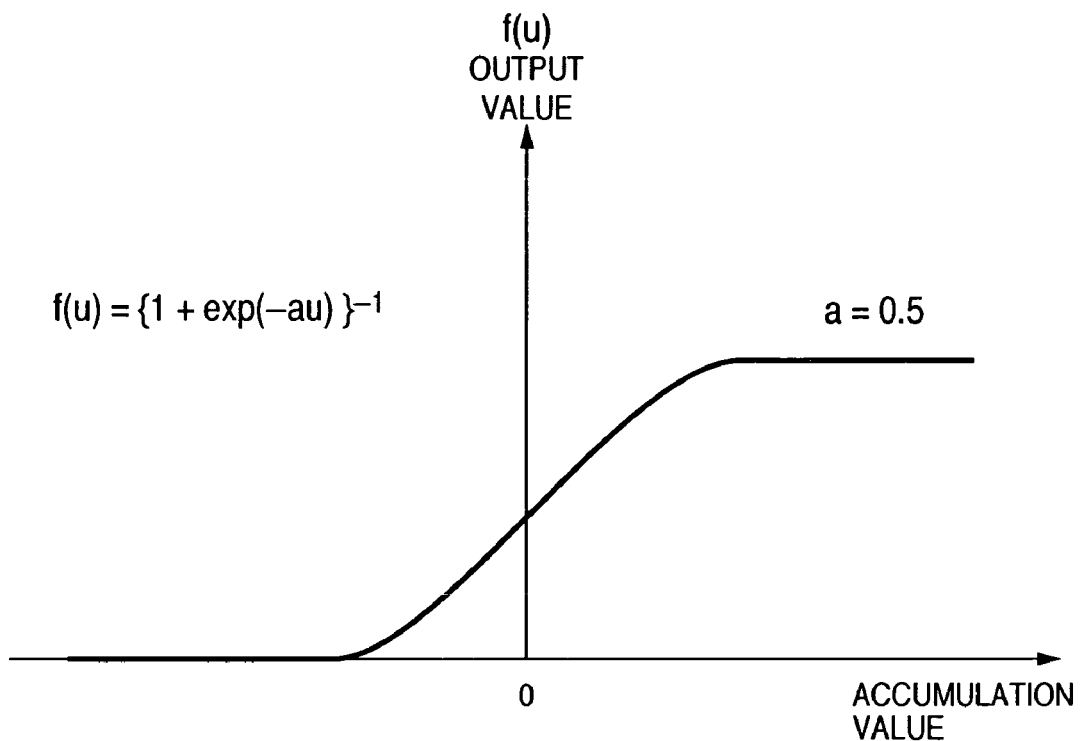
FIG. 23 is a view showing sigmoid conversion.

Subsequently, as shown in FIGS. 22A and 22B, the accumulation value calculated by each operation block is input to a function processing block 65 which executes processing function processing. The function processing block 65 may execute either nonlinear function processing or linear function processing in accordance with the purpose. In this embodiment, as an example, a processing block which executes sigmoid conversion shown in FIG. 23 is used.

The actual circuit arrangement of the function processing block 65 can be implemented by a lookup table for a digital circuit or a comparator for an analog circuit. As for the function processing, the function processing block 65 may be connected to another portion when it executes processing for the accumulation result calculated by operation unit 1. Various circuit arrangements are proposed for the function processing block 65. However, they are not the gist of the present invention, and a description thereof will be omitted.

Subsequently, the value (corresponding to the operand value Xi in the next layer) as the result of sigmoid conversion by the function processing block 65 is held in an input holding block corresponding to the next layer. In this case, the label of the value (corresponding to the operand value Xi in the next layer) is also held simultaneously.

By repeating the above-described operation processing, the operation processing in the neural network shown in FIG. 21 can be realized. In this example, the method described in the first, second, third, and fourth embodiments is used as the product-sum operation method. Hence, a neural network circuit having the effect described in the first, second, third, and fourth embodiments can be formed.

Figure 24A:
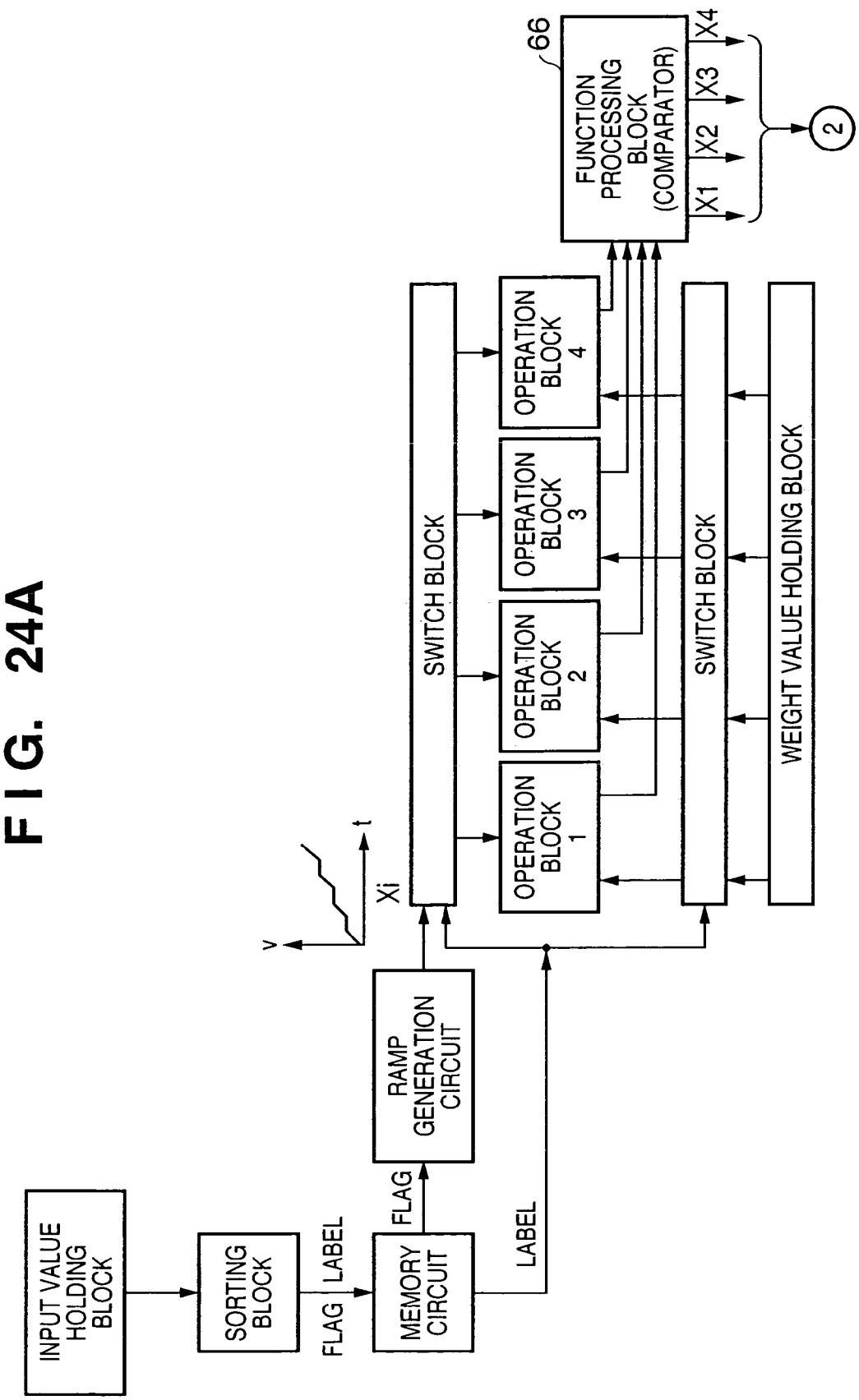
FIGS. 24A and 24B are block diagrams showing another example of the product-sum operation circuit according to the eighth embodiment.
Figure 24B:
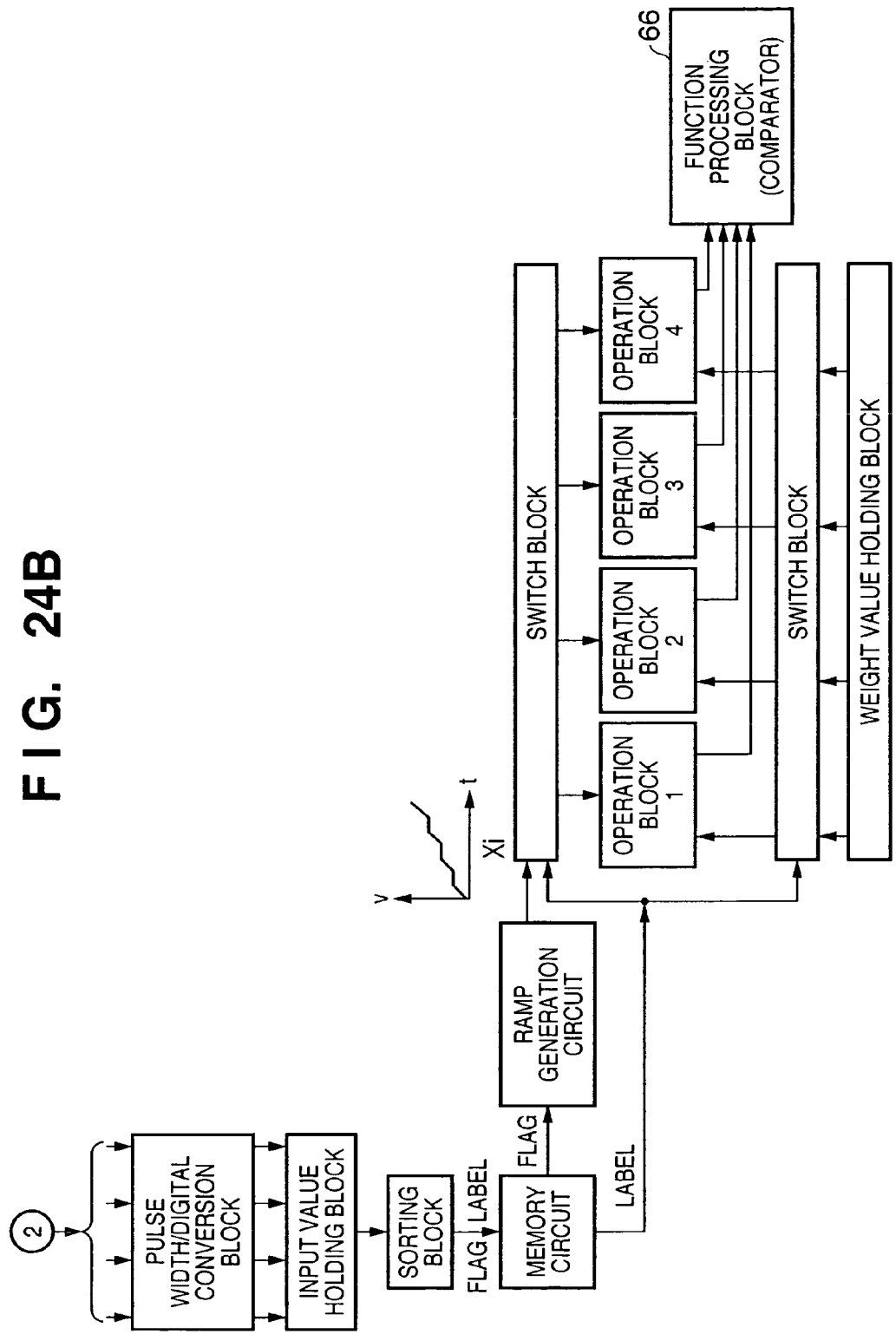

In addition, for input/output between the neuron elements (between the layers), the operand value Xi can be input to the neuron element circuit at the subsequent stage as a PWM signal, as in the first, second, third, and fourth embodiments. When the operation block is an analog operation circuit, as shown in FIGS. 24A and 24B, the charge amount accumulated in the capacitor is read out as a PWM signal by a comparator 66 and input to a pulse width/digital conversion block 67 at the subsequent stage.

The PWM signal generation method by the comparator 66 is widely known, and a detailed description thereof will be omitted. When a ramp voltage waveform is input as a reference voltage, a PWM signal corresponding to the charge amount can be read out. When a nonlinear voltage waveform is input as a reference voltage, a PWM signal nonlinearly corresponding to the charge amount can be read out. That is, the comparator 66 can function as a function processing block. Alternatively, after the charge amount accumulated in the capacitor is read out by the comparator 66 as a PWM signal proportional to the charge amount and converted into a digital value by the pulse width/digital conversion block 67 at the subsequent stage, function processing may be executed by using a lookup table.

The number of neuron elements and the number of layers in this embodiment do not limit the arrangement of the neural network according to the present invention. These numbers can be set to arbitrary numbers as needed.

Ninth Embodiment

Figure 25A:
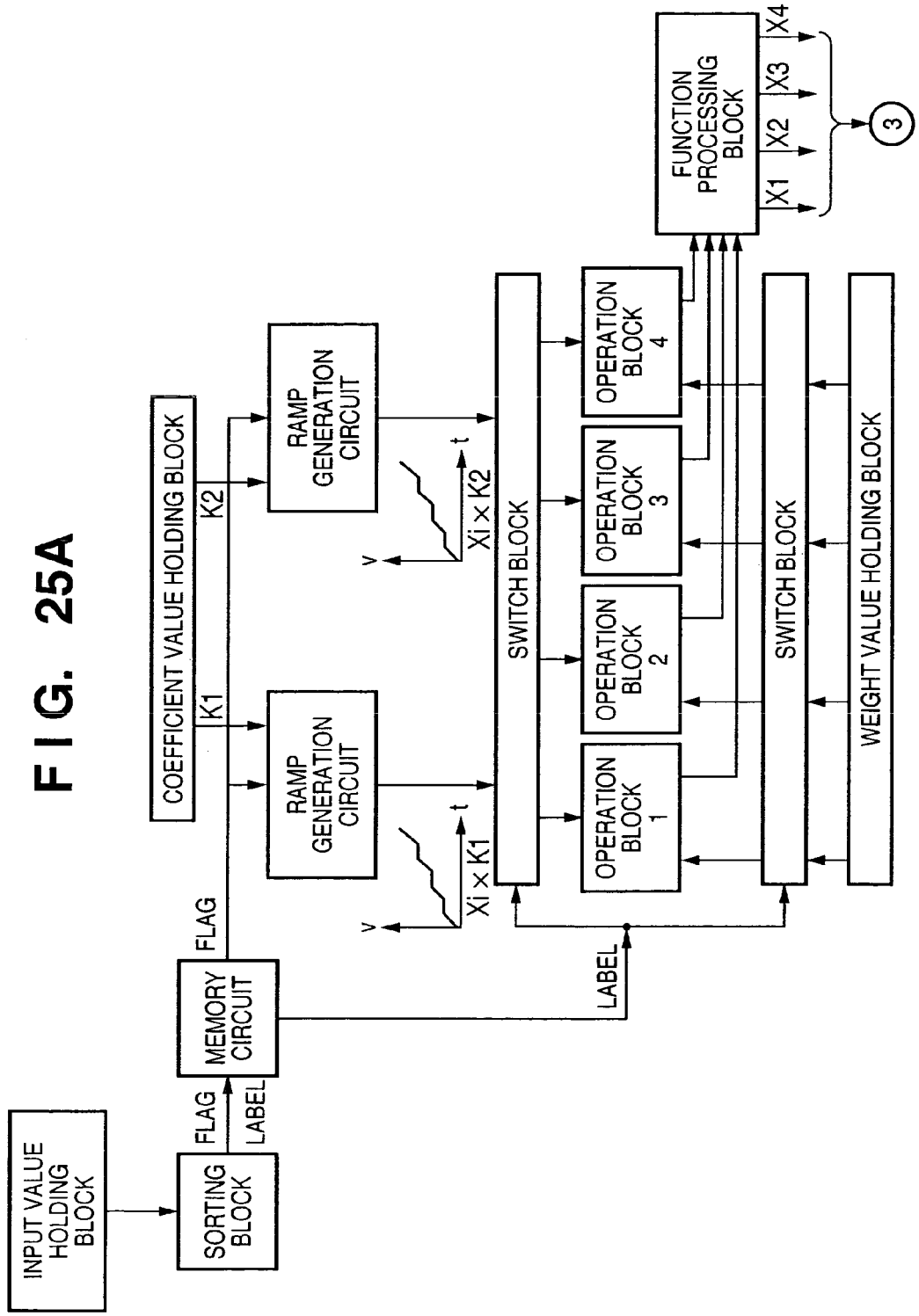
FIGS. 25A and 25B are block diagrams showing an example of a product-sum operation circuit according to the ninth embodiment.
Figure 25B:
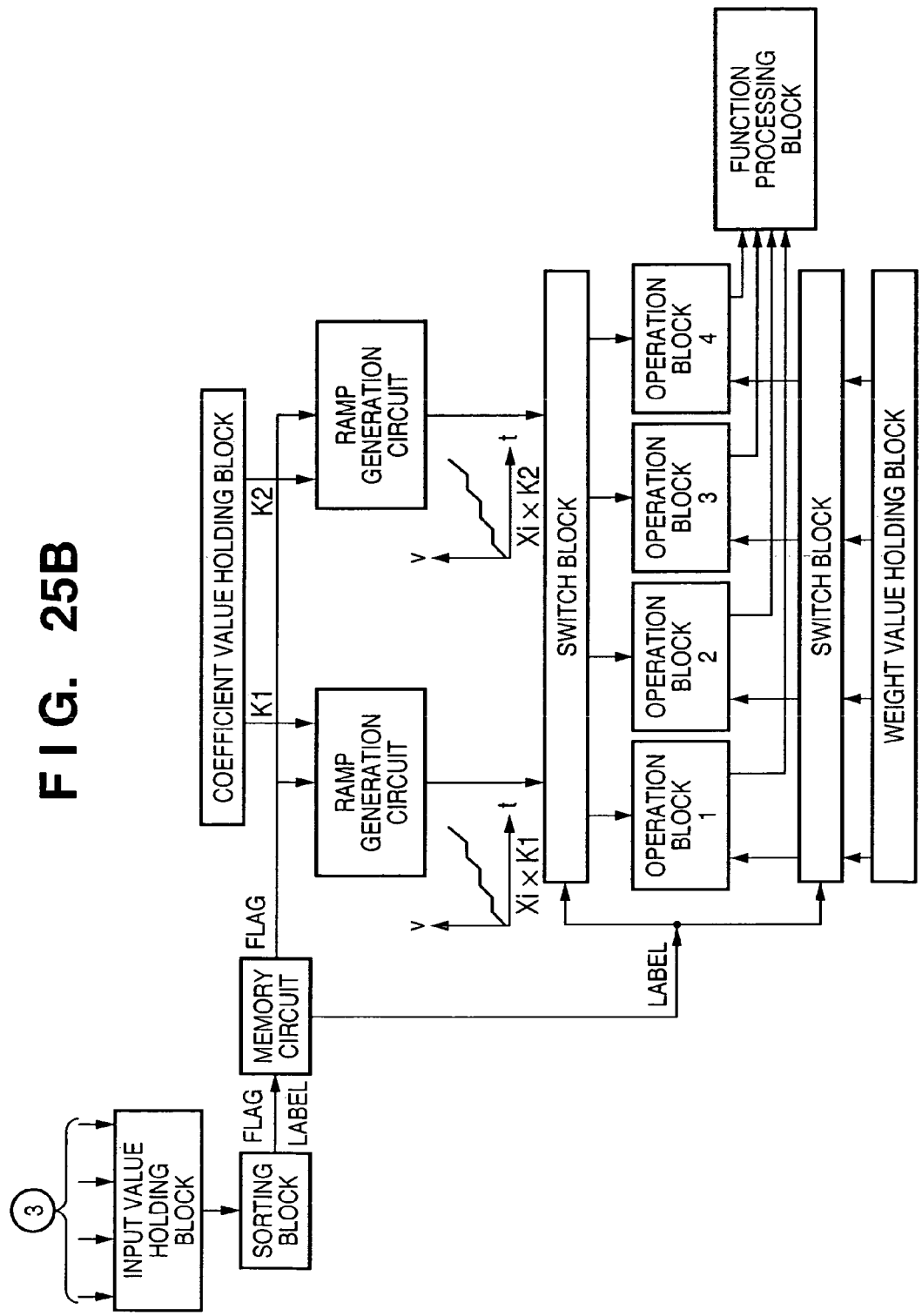

The ninth embodiment will be described with reference to FIGS. 25A and 25B.

A neural network model according to this embodiment is the same as that described in the eighth embodiment except that a synaptic weight value is expressed by a product Wi×Ki of an operand value Wi and a coefficient Ki. FIGS. 25A and 25B shows the arrangement of an operation processing block when the product-sum operation method described in the fifth, sixth, or seventh embodiment is applied to the neural network according to this embodiment (FIGS. 25A and 25B shows a circuit to which the product-sum operation described in the seventh embodiment is applied).

As the model of a neuron element in this embodiment, a neuron element weights the output values from a plurality of neuron elements at the preceding stage by a synaptic weight represented by Wi×Ki and calculates the sum of the weighted values to determine the internal state value of the neuron element. The neuron element circuit according to this embodiment uses, as the model of the neuron element, the operation processing block described in the fifth, sixth, or seventh embodiment. More specifically, an operand value Xi described in the fifth, sixth, or seventh embodiment corresponds to the output value from the neuron element at the preceding stage, and the product of the operand value Wi and coefficient Ki corresponds to the synaptic weight value to determine the internal state value of the neuron element.

The function processing to be executed subsequently and input/holding of the operand value after the function processing are the same as in the eighth embodiment, and a description thereof will be omitted. For input/output between the neuron elements (between the layers), the operand value Xi can be input to the neuron element circuit at the subsequent stage as a PWM signal, as in the eighth embodiment, and a description thereof will be omitted.

In this embodiment, the method described in the fifth, sixth, or seventh embodiment is used as the product-sum operation method. Hence, a neural network circuit having the effect described in the fifth, sixth, or seventh embodiment can be formed. The number of neuron elements and the number of layers in this embodiment do not limit the arrangement of the neural network according to ht present invention. These numbers can be set to arbitrary numbers as needed.

10th Embodiment

The operation processing of a neural network can generally be explained by the model shown in FIG. 21. In an actual operation, even when, of output values input from neurons at the preceding stage to a neuron element, only output values with a predetermined value or more are subjected to the operation processing to determine the internal state, the ultimate operation capability of the neural network rarely changes in many cases. In such a case, when operation processing for values smaller than the predetermined value is omitted, a neural network formed as a circuit is advantageous in power consumption or operation speed.

In this embodiment, an operation processing method will be described in which for the first to seventh embodiments applied to a neural network in the eighth and ninth embodiments, operand values Xi are sorted in descending order of magnitude by a sorting block 4, and operation for the operand values Xi smaller than a predetermined value is omitted.

Figure 26:
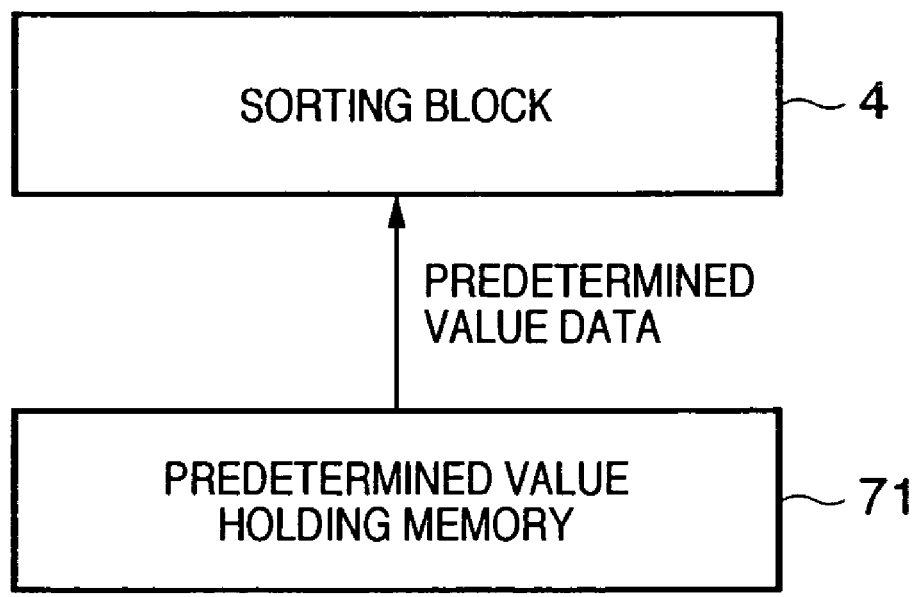
FIG. 26 is a block diagram showing a sorting circuit and predetermined value holding memory in a product-sum operation circuit according to the 10th embodiment.

FIG. 26 shows only a part where a predetermined value holding memory 71 is added to the sorting block 4 to realize the function of this embodiment in FIGS. 1, 5, 10, 14, 16, 17, 19, 22A, 22B, 24A, 24B, 25A and 25B which show the operation processing arrangements described in the first to seventh embodiments. Hence, the arrangement is the same as those shown in FIGS. 1, 5, 10, 14, 16, 17, 19, 22A, 22B, 24A, 24B, 25A and 25B except the portion shown in FIG. 26.

More specifically, data related to a predetermined value is input from the predetermined value holding memory 71 to the sorting block 4. Sorting processing for the operand values Xi is ended when reaching the predetermined value. When an associative memory is used as the sorting circuit, omission of the product-sum operation for the operand values Xi smaller than the predetermined value is realized by ending the processing when the search value is sequentially decreased in searching the contents in the associative memory, and the search value has reached the predetermined value input from the predetermined value holding memory 71. When a WTA circuit is used as the sorting block 4, the omission is realized by ending the processing when the reference voltage value has reached the predetermined value input from the predetermined value holding memory 71 in sorting by the WTA circuit.

In this embodiment, the two examples of the circuit which omits the product-sum operation for the operand values Xi having values smaller than the predetermined value have been described. However, any other circuit and method can be used if they have the same effect as described above.

As described above, when the product-sum operation for the operand values Xi having values smaller than the predetermined value is omitted, the power consumption can be reduced, and the operation speed can be increased in the actual processing block.

11th Embodiment

In some cases, the operation processing capability of a neural network increases when output values which are input from neurons at the preceding stage to a neuron element and are smaller than a predetermined value are regarded as a constant value and subjected to the operation instead of omitting the operation processing for them as in the 10th embodiment. In this embodiment, an operation processing method will be described in which operand values Xi are sorted in descending order of magnitude by a sorting block 4, and operand values Xi smaller than a predetermined value are regarded as a constant value in the 10th embodiment.

Figure 27:
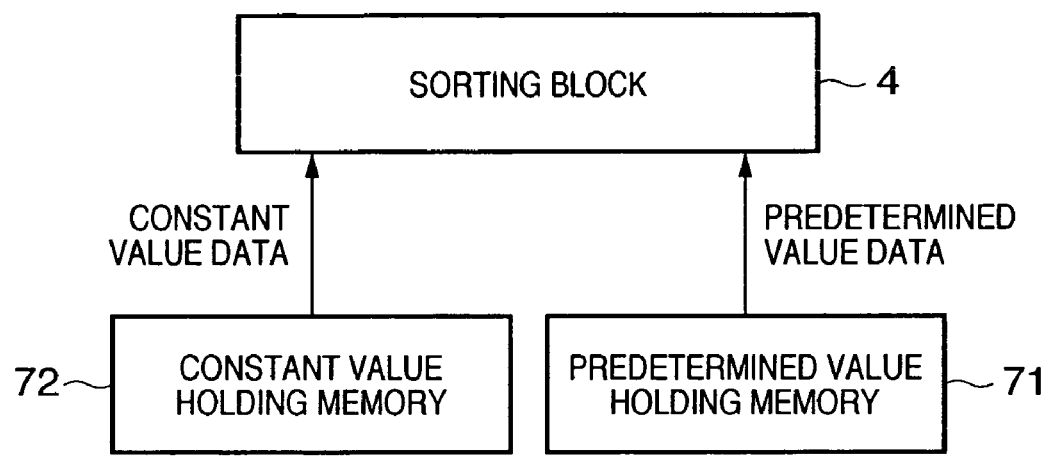
FIG. 27 is a block diagram showing a sorting circuit, constant value holding memory, and predetermined value holding memory in a product-sum operation circuit according to the 11th embodiment.

The arrangement shown in FIG. 27 is different from the 10th embodiment in that the above-described sorting block 4 shown in FIG. 26 is further added a constant value holding memory 72. Arrangements except the part shown in FIG. 27 are the same as those described in the 10th embodiment.

More specifically, data related to a predetermined value is input from a predetermined value holding memory 71 to the sorting block 4. Sorting processing for the operand values Xi is ended when reaching the predetermined value. In addition, data related to a constant value is input from the constant value holding memory 72 to the sorting block 4. The constant value is output as the operand value Xi.

When an associative memory is used as the sorting block 4 in the 10th embodiment, the circuit which operates the operand value Xi smaller than the predetermined value as a constant value can be implemented by outputting the constant value input from the constant value holding memory 72 as the operand value Xi after reaching the predetermined value when the search value is sequentially decreased in searching the contents in the associative memory. Any other circuit and method can be used if they can realize the same function as described above.

When a WTA circuit is used as the sorting block 4 in the 10th embodiment, the circuit can be implemented by outputting the constant value input from the constant value holding memory 72 as a voltage value corresponding to the operand value Xi after the reference voltage value reaches the predetermined value in sorting by the WTA circuit. Any other circuit and method can be used if they can realize the same function as described above.

12th Embodiment

The operation processing of a neural network can generally be explained by the model shown in FIG. 21. In an actual operation, even when, of output values input from neurons at the preceding stage to a neuron element, only output values corresponding to a predetermined ratio when counted from a large value are subjected to the operation processing to determine the internal state, the ultimate operation capability of the neural network rarely changes in many cases. In such a case, when operation processing for values except those of the predetermined ratio when counted from a large value is omitted, a neural network formed as a circuit is advantageous in power consumption or operation speed.

In this embodiment, an operation processing method will be described in which for the first to seventh embodiments applied to a neural network in the eighth and ninth embodiments, operand values Xi are sorted in descending order of magnitude by a sorting block 4, and operation for the operand values Xi except those corresponding to a predetermined ratio when counted from a large value is omitted.

Figure 28:
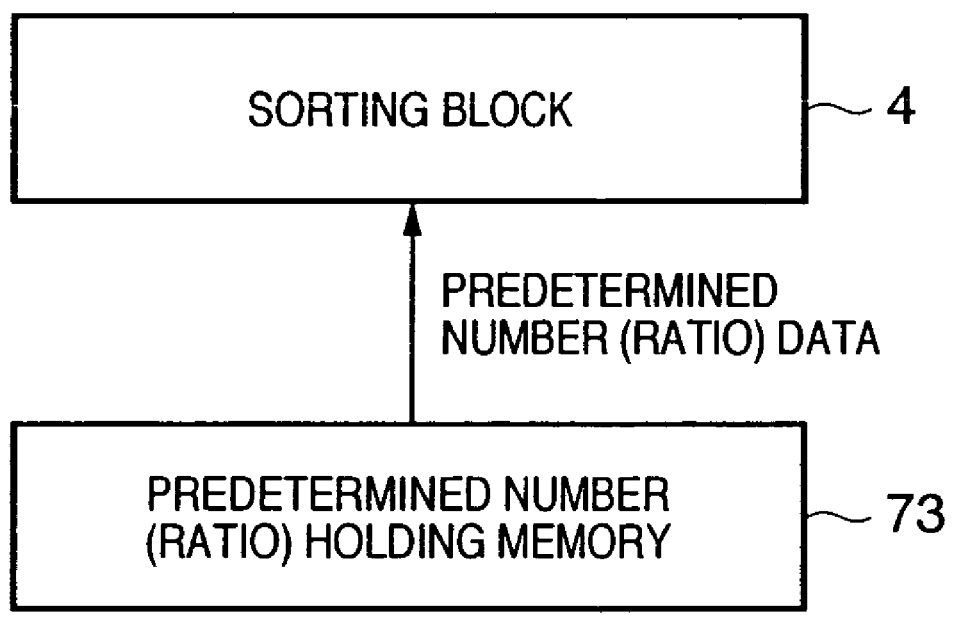
FIG. 28 is a block diagram showing a sorting circuit and predetermined value (ratio) holding memory in a product-sum operation circuit according to the 12th Embodiment.

FIG. 28 shows only a part where a predetermined number (ratio) holding memory 73 is added to the sorting block 4 to realize the function of this embodiment in FIGS. 1, 5, 10, 14, 16, 17, 19, 22A, 22B, 24A, 24B, 25A and 25B which show the operation processing arrangements described in the first to seventh embodiments. Hence, the arrangement is the same as those shown in FIGS. 1, 5, 10, 14, 16, 17, 19, 22A, 22B, 24A, 24B, 25A and 25B except the portion shown in FIG. 28.

More specifically, data related to a predetermined number (ratio) is input from the predetermined number (ratio) holding memory 73 to the sorting block 4. Sorting processing for the operand values Xi is ended when reaching the predetermined number (ratio).

When an associative memory is used as the sorting circuit 4, omission of the product-sum operation for the operand values Xi except those corresponding to the predetermined number (ratio) when counted from a large value is realized by ending the processing when the number of output operand values Xi has reached the predetermined number (ratio) input from the predetermined number (ratio) holding memory 73 in searching the contents in the associative memory and sequentially decreasing the search value. When a WTA circuit is used as the sorting block 4, the omission is realized by ending the processing when the reference voltage value has reached a voltage value corresponding to the operand value Xi when reaching the predetermined number (ratio).

In this embodiment, the two examples of the circuit which omits the product-sum operation for the operand values Xi except those corresponding to the predetermined number (ratio) when counted from a large value have been described. However, any other circuit and method can be used if they have the same effect as described above.

As described above, when the product-sum operation for the operand values Xi except those corresponding to the predetermined number (ratio) when counted from a large value is omitted, the power consumption can be reduced, and the operation speed can be increased in the actual processing block.

13th Embodiment

In some cases, the operation processing capability of a neural network increases when of output values which are input from neurons at the preceding stage to a neuron element, output values except those corresponding to a predetermined ratio when counted from a large value are regarded as a constant value and subjected to the operation instead of omitting the operation processing for them as in the 12th embodiment.

In this embodiment, an operation processing method will be described in which operand values Xi are sorted in descending order of magnitude by a sorting block 4, and the operand values Xi except those corresponding to a predetermined ratio when counted from a large value are regarded as a constant value in the 12th embodiment.

Figure 29:
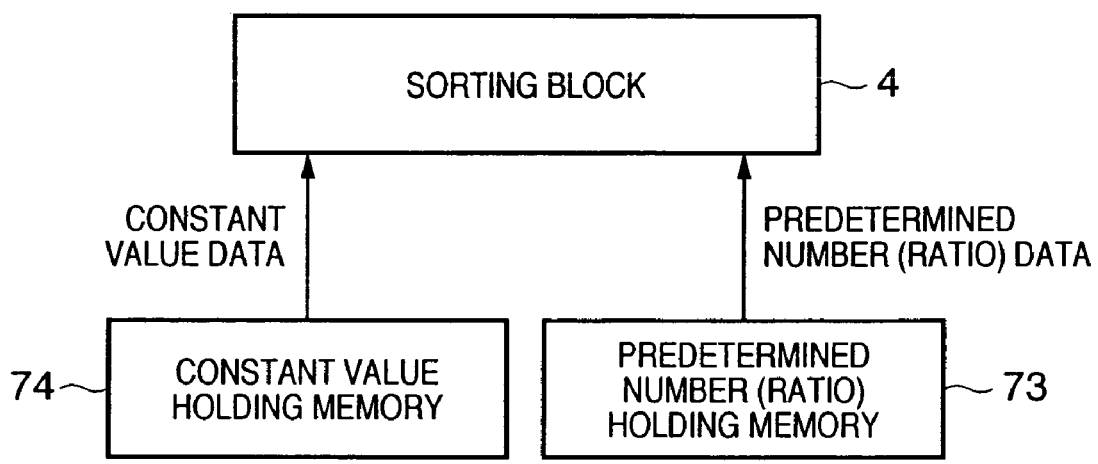
FIG. 29 is a block diagram showing a sorting circuit, predetermined value (ratio) holding memory, and constant value holding memory in a product-sum operation circuit according to the 13th embodiment.

The arrangement shown in FIG. 29 is different from the 12th embodiment in that the above-described sorting block 4 shown in FIG. 28 is further added a constant value holding memory 74. Arrangements except the part shown in FIG. 29 are the same as those described in the 12th embodiment.

More specifically, data related to a predetermined number (ratio) is input from a predetermined number (ratio) holding memory 73 to the sorting block 4. Sorting processing for the operand values Xi is ended when reaching the predetermined number (ratio). In addition, data related to a constant value is input from the constant value holding memory 74 to the sorting block 4. The constant value is output as the operand value Xi.

When an associative memory is used as the sorting block 4, the method of operating the operand values Xi except those corresponding to the predetermined ratio when counted from a large value as a constant value can be implemented by outputting, as the constant value input from the constant value holding memory 74, the operand value Xi after the number of output operand values Xi reaches the predetermined number (ratio) input from the predetermined number (ratio) holding memory 73 when the search value is sequentially decreased in searching the contents in the associative memory. Any other circuit and method can be used if they can realize the same function as described above.

When a WTA circuit is used as the sorting block 4, the circuit can be implemented by outputting, as the constant value input from the constant value holding memory 74, a voltage value corresponding to the operand value Xi after the reference voltage value reaches a voltage value corresponding to the operand value Xi when reaching the predetermined number (ratio) input from the predetermined number (ratio) holding memory 73 in sorting by the WTA circuit. Any other circuit and method can be used if they can realize the same function as described above.

14th Embodiment

Figure 30A:
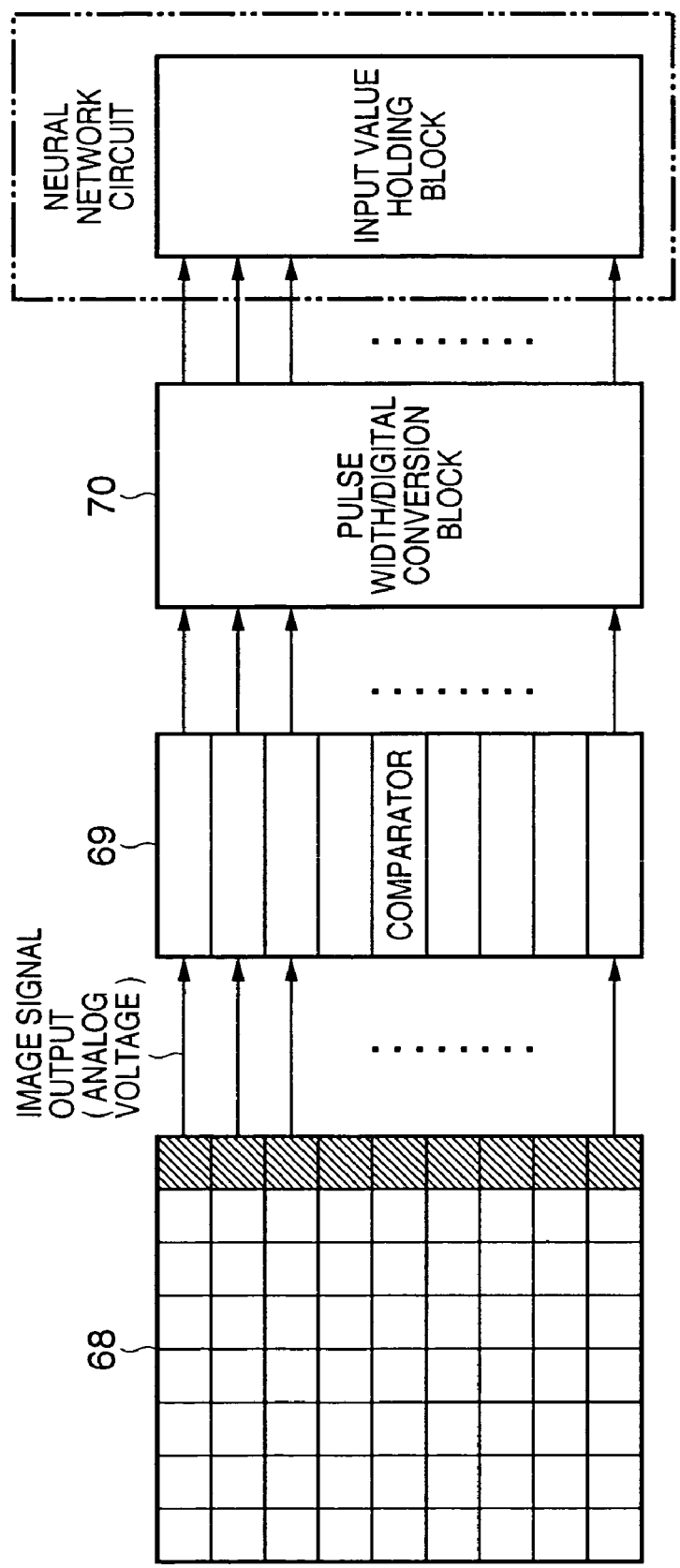

FIGS. 30A and 30B show examples of a product-sum operation method of executing image processing in the 14th embodiment. As shown in FIGS. 30A and 30B, as a characteristic feature, this product-sum operation method includes the neural network circuit described in the eighth to 13th embodiments. FIGS. 30A and 30B shows only the first stage of the hierarchical structure and does not illustrate the subsequent layers. The signal input here is an image signal. More specifically, an object of the product-sum operation method according to this embodiment is to execute desired image processing (e.g., pattern detection and pattern recognition) by causing the neural network circuit to execute a predetermined operation for an input image signal.

The contents of image processing to be actually realized can be set by appropriately adjusting an operand value Wi and coefficient value Ki of the neural network circuit such that desired processing contents (e.g., pattern detection and pattern recognition) are realized. A detailed adjusting method is not the gist of the present invention, and a description thereof will be omitted.

In this embodiment, an image signal output from an image sensing device (e.g., a CCD or CMOS image sensor) corresponds to an operand value Xi in the first to seventh embodiments. Hence, the operation processing executed for the image signal is the same as that executed for the operand value Xi in the first to 13th embodiments.

The image signal is input as an analog signal, digital signal, or PWM signal. Operation processing corresponding to each signal type corresponds to the signal type of the operand value Xi described in the first to 13th embodiments. The operation processing is the same as in the embodiments, and a description thereof will be omitted. Referring to FIGS. 30A and 30B, an image signal as an analog signal is converted into a PWM signal by a comparator 69, then converted into a digital value by a pulse width/digital conversion block 70, and input to the neural network circuit.

The image sensing device is assumed to be a CCD or CMOS image sensor. Any other image sensing device can also be used without any problem. The number of image sensing devices, the number of neuron elements, and the number of layers in this embodiment do not limit the arrangement of the image signal processing circuit according to the present invention. These numbers can be set to arbitrary numbers as needed.

Figure 31:
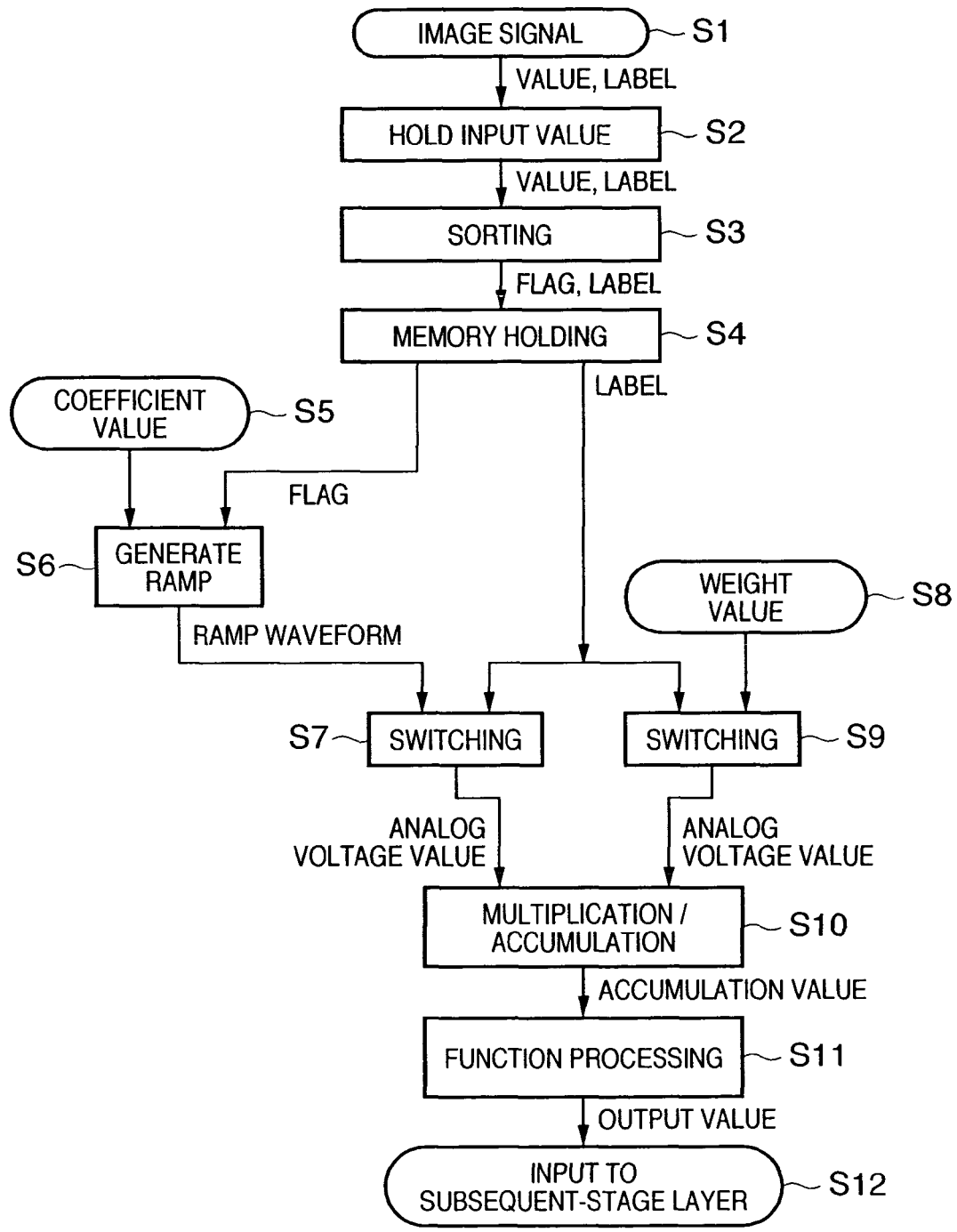
FIG. 31 is a flowchart showing operation processing in the 14th embodiment.

FIG. 31 shows the above-described operation processing flow. First, a step S1 of inputting an image signal output from the image sensing device is executed. Next, an input value holding step S2 of holding the input signal is executed. Subsequently, a sorting step S3 of output the held input values in descending order of magnitude is executed. A memory holding step S4 of holding the flag and label in a memory is executed.

In a ramp generation step S6, a voltage waveform (ramp waveform) which monotonically increases over time is generated on the basis of the coefficient value input in a coefficient value input step S5 and the flag input in the memory holding step S4 and input to a switching step S7. In the switching step S7, the ramp waveform is input to an appropriate operation block in accordance with the label input in the memory holding step S4.

In a switching step S9, a weight value input in a weight value input step S8 is input to an appropriate operation block in accordance with the label input in the memory holding step S4. In the operation block to which the ramp waveform and weight value are input, a multiplication/accumulation step S10 is executed, and an accumulation value is output to a function processing step S11. In the function processing step S11, predetermined function processing is executed, and a step S12 of inputting the output value to the subsequent-stage layer is executed. On the subsequent-stage layer side, the above-described operation processing step is repeated a necessary number of times (number of layers).

As described above, when operation processing by a neural network circuit is applied to an image signal, desired operation processing (e.g., pattern detection and pattern recognition) can be realized.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-356625 filed on Oct. 16, 2003 which is hereby incorporated herein by reference herein.

The invention claimed is:

1. A product-sum operation circuit comprising:
   a sorting circuit which outputs a plurality of operand values in descending or ascending order of magnitude of the operand values;
   a multiplication circuit which multiplies each operand value output from said sorting circuit by a corresponding operand value; and
   an accumulated sum circuit which calculates an accumulated sum of multiplication results by said multiplication circuit.

2. The product-sum operation circuit according to claim 1, wherein said sorting circuit outputs, of the plurality of operand values, operand values not less than a predetermined value.

3. The product-sum operation circuit according to claim 1, wherein said sorting circuit outputs a constant value in place of operand values less than a predetermined value in the plurality of operand values.

4. The product-sum operation circuit according to claim 1, wherein said sorting circuit sorts the plurality of operand values in descending or ascending order of magnitude of the operand values and outputs a predetermined ratio of an upper part of the sorted operand values.

5. The product-sum operation circuit according to claim 1, wherein said sorting circuit sorts the plurality of operand values in descending or ascending order of magnitude of the operand values and outputs a constant value in place of operand values except a predetermined ratio of an upper part of the sorted operand values.

6. The product-sum operation circuit according to claim 1, further comprising a plurality of operation blocks each including said multiplication circuit and said accumulated sum circuit.

7. The product-sum operation circuit, according to claim 6, wherein said plurality of operation blocks execute an operation in parallel.

8. The product-sum operation circuit according to claim 6, wherein each of the plurality of operand values includes a label, and each operand value is multiplied in the operation block corresponding to the label.

9. The product-sum operation circuit according to claim 8, further comprising a switch circuit which switches a path to input each operand value to the operation block corresponding to the label.

10. The product-sum operation circuit according to claim 1, wherein said multiplication circuit executes a weighting operation of multiplying each operand value by a respective weight value.

11. The product-sum operation circuit according to claim 1, wherein
the plurality of operand values are digital signals, and
said sorting circuit outputs the plurality of operand values in descending or ascending order of magnitude of the operand values by using an associative memory.

12. The product-sum operation circuit according to claim 1, further comprising a signal output circuit which outputs a voltage signal which monotonically increases or decreases over time to said multiplication circuit in accordance with the output from said sorting circuit.

13. The product-sum operation circuit according to claim 12, wherein said signal output circuit comprises means for multiplying the voltage signal by a predetermined coefficient.

14. The product-sum operation circuit according to claim 1, wherein
the plurality of operand values are analog signals, and
said sorting circuit outputs the plurality of operand values in descending or ascending order of magnitude of the operand values by using a Winner-Take-All circuit.

15. The product-sum operation circuit according to claim 1, wherein said multiplication circuit receives a voltage value corresponding to the operand value as a control voltage of a voltage controlled current source and a voltage controlled resistive device and outputs a multiplication result as a voltage value.

16. A neural network having a plurality of stages of neuron elements, wherein
each neuron element includes a product-sum operation circuit of any one of claims 1 to 14, and
said product-sum operation circuit receives output values from neuron elements at a preceding stage as the plurality of operand values,
causes said multiplication circuit to multiply each operand value by a synaptic weight as a corresponding operand value, and
calculates an internal state value as the accumulated sum.

17. A method of executing a product-sum operation, comprising the steps of:
(a) outputting, by a sorting circuit, a plurality of operand values in descending or ascending order of magnitude of the operand values;
(b) multiplying, by a multiplication circuit, each output operand value by a corresponding operand value; and
(c) calculating, by an accumulation sum circuit, an accumulated sum of multiplication results in the step (b).

* * * * *